United States Patent [19]

Haley, Jr. et al.

[11] Patent Number: 4,561,057
[45] Date of Patent: Dec. 24, 1985

[54] APPARATUS AND METHOD FOR MONITORING MOTION OF A RAILROAD TRAIN

[75] Inventors: John E. Haley, Jr.; Michael J. Lynch; Jeffrey S. Rosenberg, all of Duncan, Okla.

[73] Assignee: Halliburton Company, Duncan, Okla.

[21] Appl. No.: 485,079

[22] Filed: Apr. 14, 1983

[51] Int. Cl.$^4$ ............... G11B 5/00; G06G 15/48; B60L 3/12
[52] U.S. Cl. ........................... 364/436; 360/6; 364/424; 364/550
[58] Field of Search .............. 364/424, 436, 438, 550, 364/551, 300; 360/5, 6, 12

[56] References Cited

U.S. PATENT DOCUMENTS

| | | | |
|---|---|---|---|
| 3,864,731 | 2/1975 | Callahan | 360/5 |
| 4,031,363 | 6/1977 | Freeman et al. | 364/425 X |
| 4,236,215 | 11/1980 | Callahan et al. | 364/424 X |
| 4,241,403 | 12/1980 | Schultz | 364/300 |
| 4,395,624 | 7/1983 | Wartski | 364/424 |

FOREIGN PATENT DOCUMENTS

| | | | |
|---|---|---|---|
| 2095408 | 9/1982 | United Kingdom | 364/424 |
| 2096078 | 10/1982 | United Kingdom | 364/424 |

OTHER PUBLICATIONS

Lynn et al.: Proceedings of the 29th Vehicular Technology Conference Arlington Heights, IL, Mar. 27-30, 1979, pp. 154/157.
Athani: Microprocessor Based Data Acquisition System Microprocessors & Microsystems (GB) vol. 3, No. 8, Oct. 1979.
Walters: 2708 EPROM for the S-100. Microcomputing, Sep. 1979, pp. 78-82, in AV. 237.
Cummings: An Inexpensive and Easy EPROM Board Microcomputing, Dec. 1979, pp. 62-63 in AV. 237.
"Harris Introduces a System to Monitor, Record, and Analyze Locomotive Conditions for Maintenance and for Train Operation Analysis," The Probe System, Harris Controls, Melbourne, FL.

Primary Examiner—Felix D. Gruber
Attorney, Agent, or Firm—E. Harrison Gilbert, III; James R. Duzan; Thomas R. Weaver

[57] ABSTRACT

An apparatus for monitoring the motion of a railroad train includes an on-board unit which computes the speed, acceleration/deceleration, and distance traveled events of the train and stores such computed data for retention by a non-volatile memory after a power interruption or outage occurs. The apparatus also includes a portable unit to which the on-board unit, or the data retaining memory thereof, can be connected for conducting data transfers from the on-board unit memory to the portable unit. Once stored in the portable unit, the information can be formated and displayed as a history of the train operation for management and maintenance personnel, for example.

18 Claims, 28 Drawing Figures

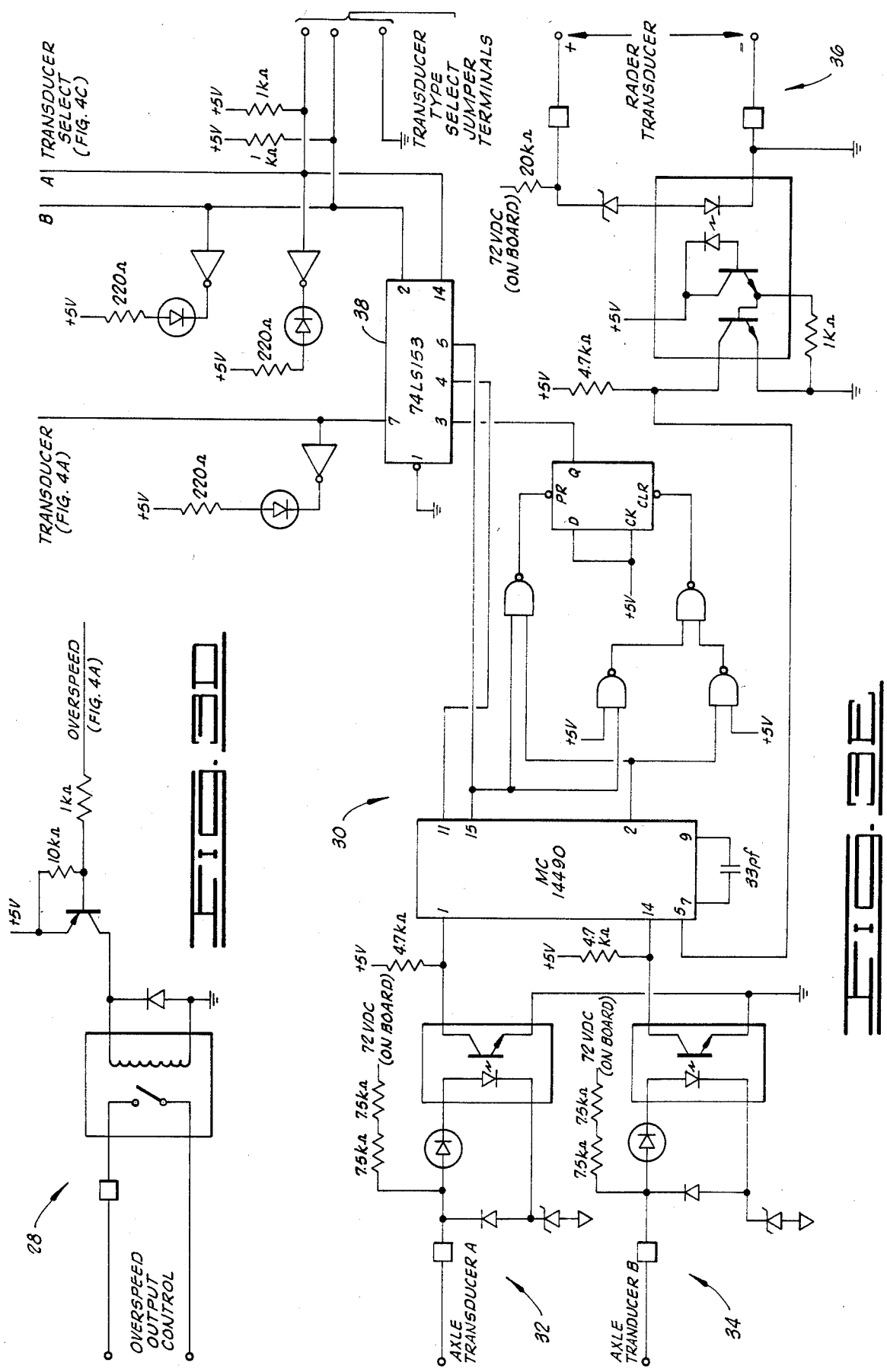

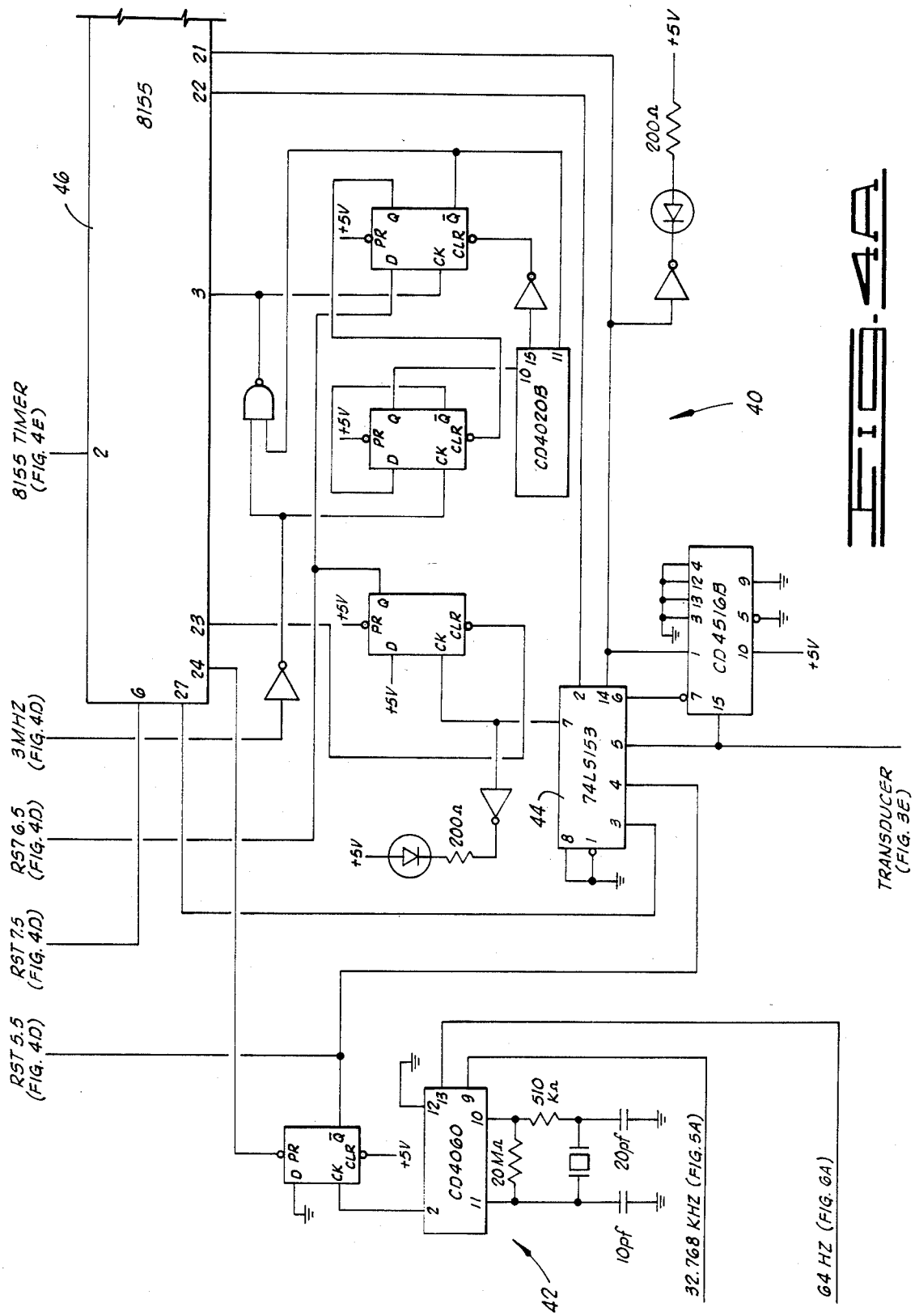

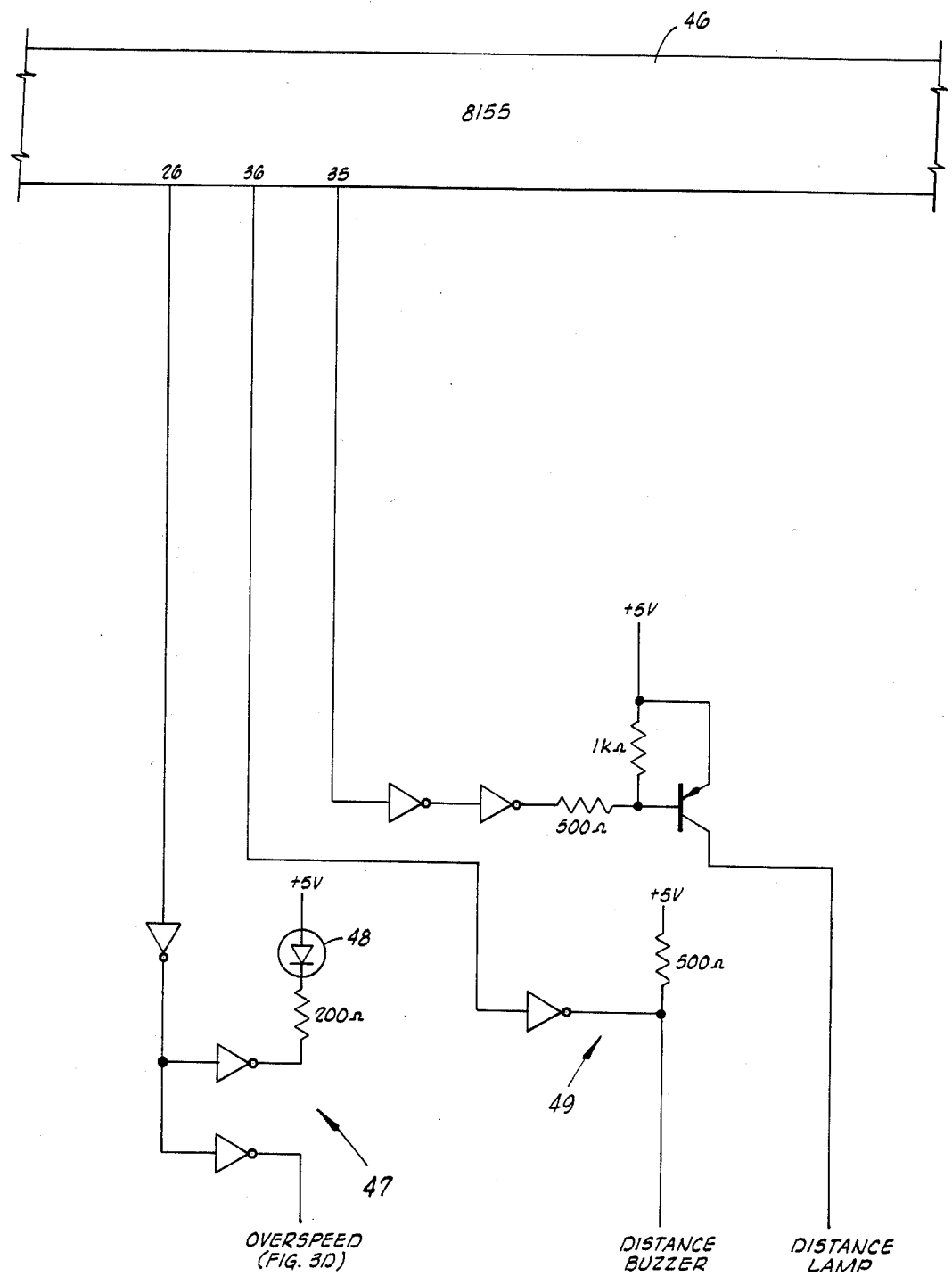

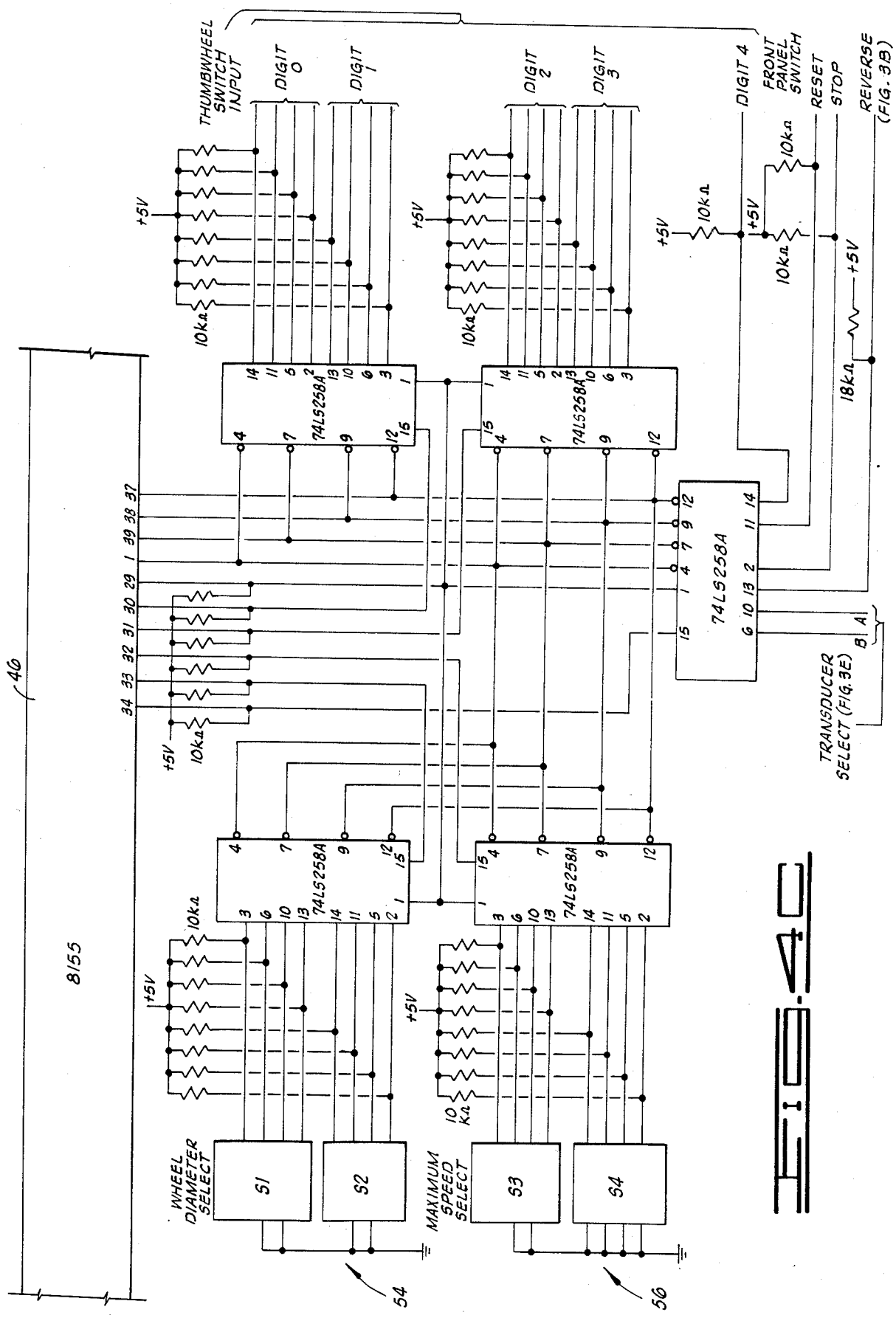

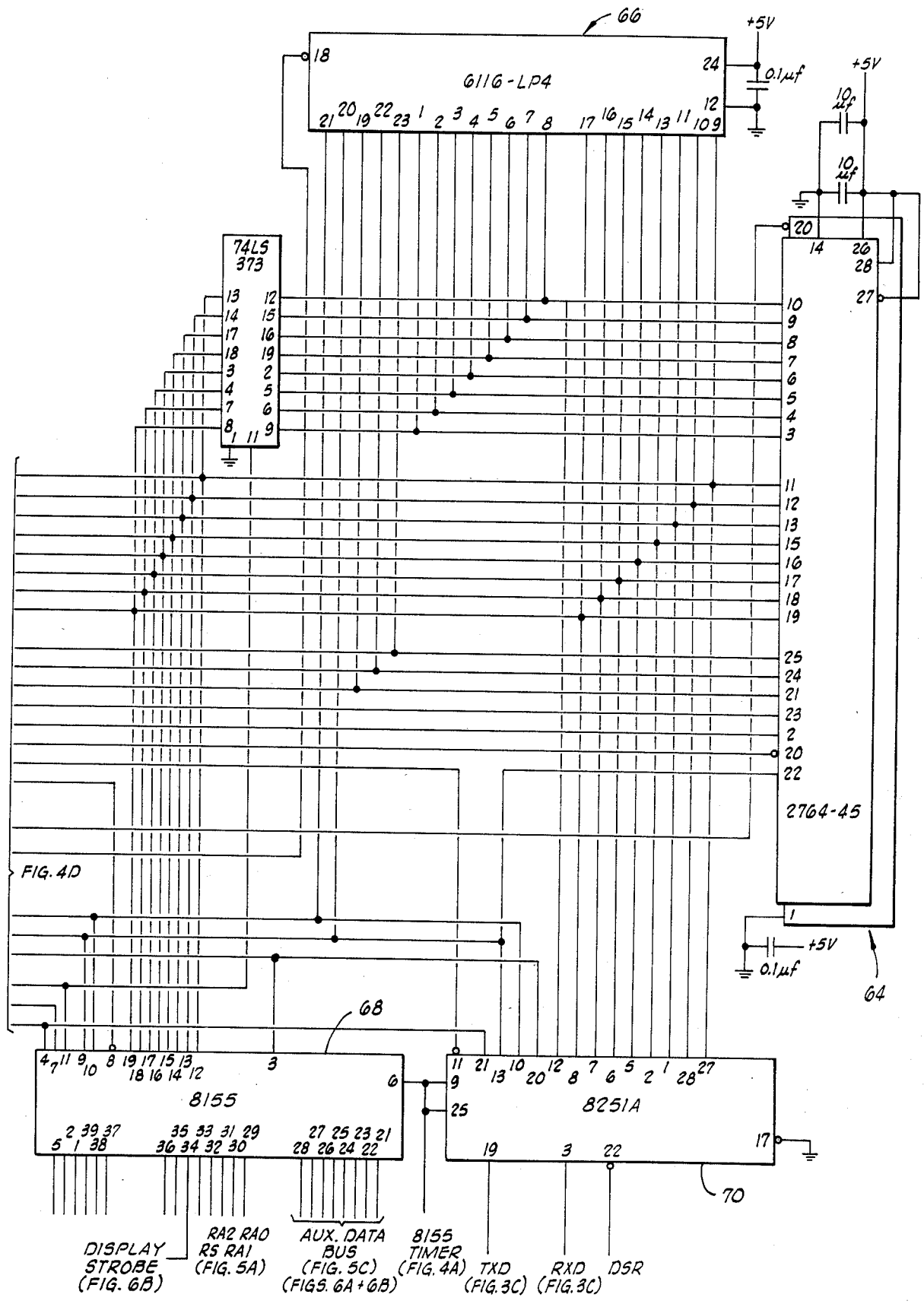

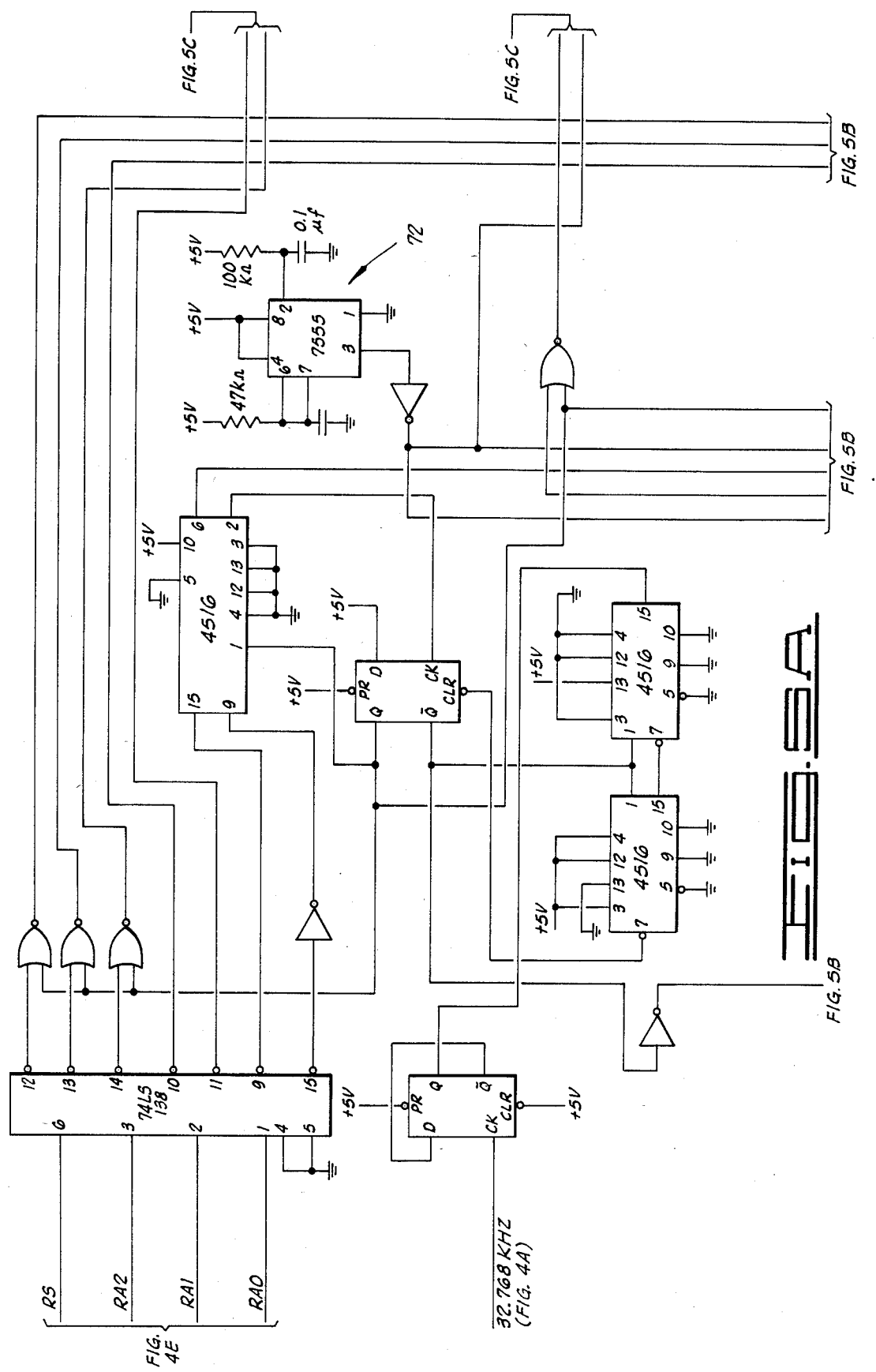

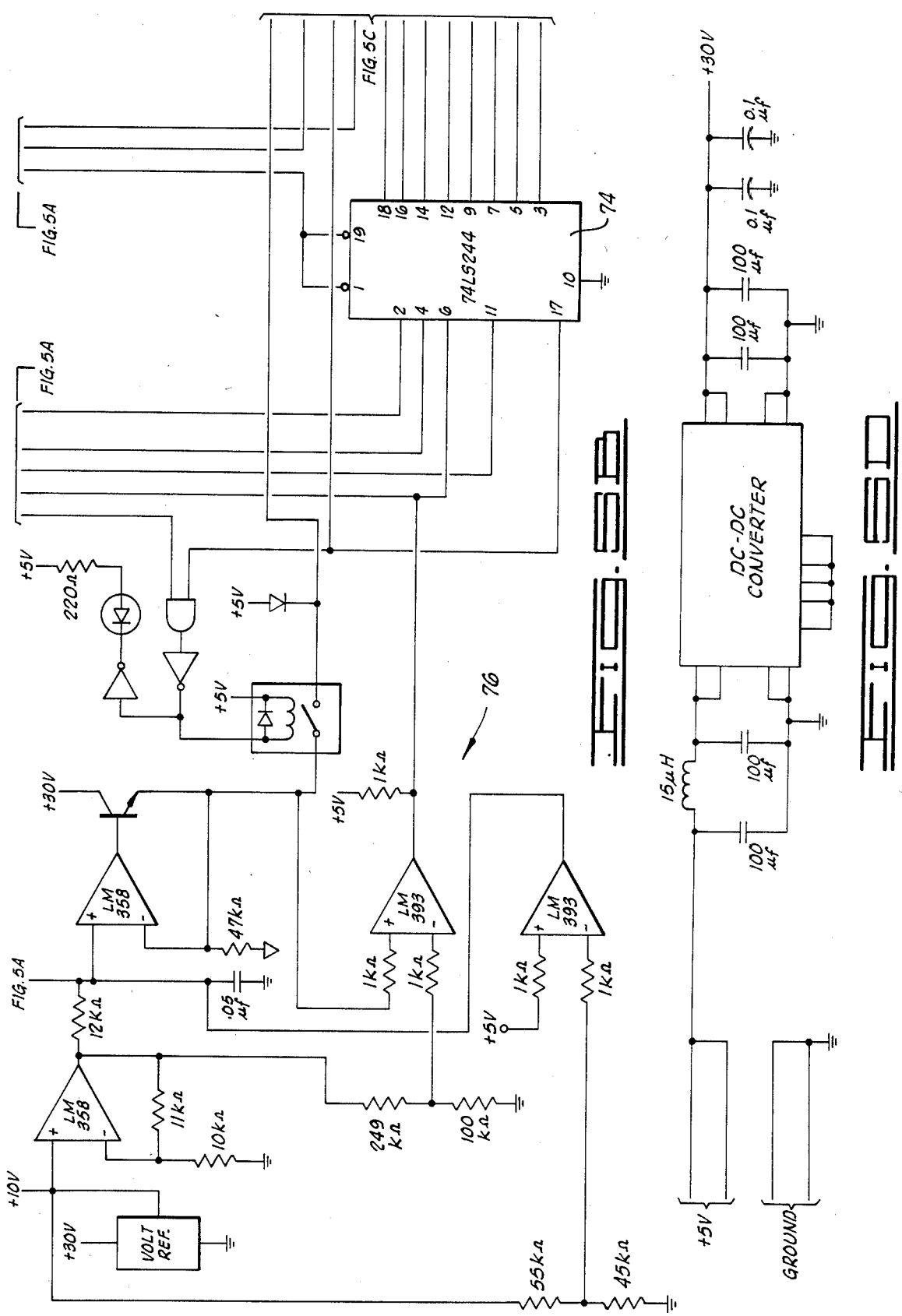

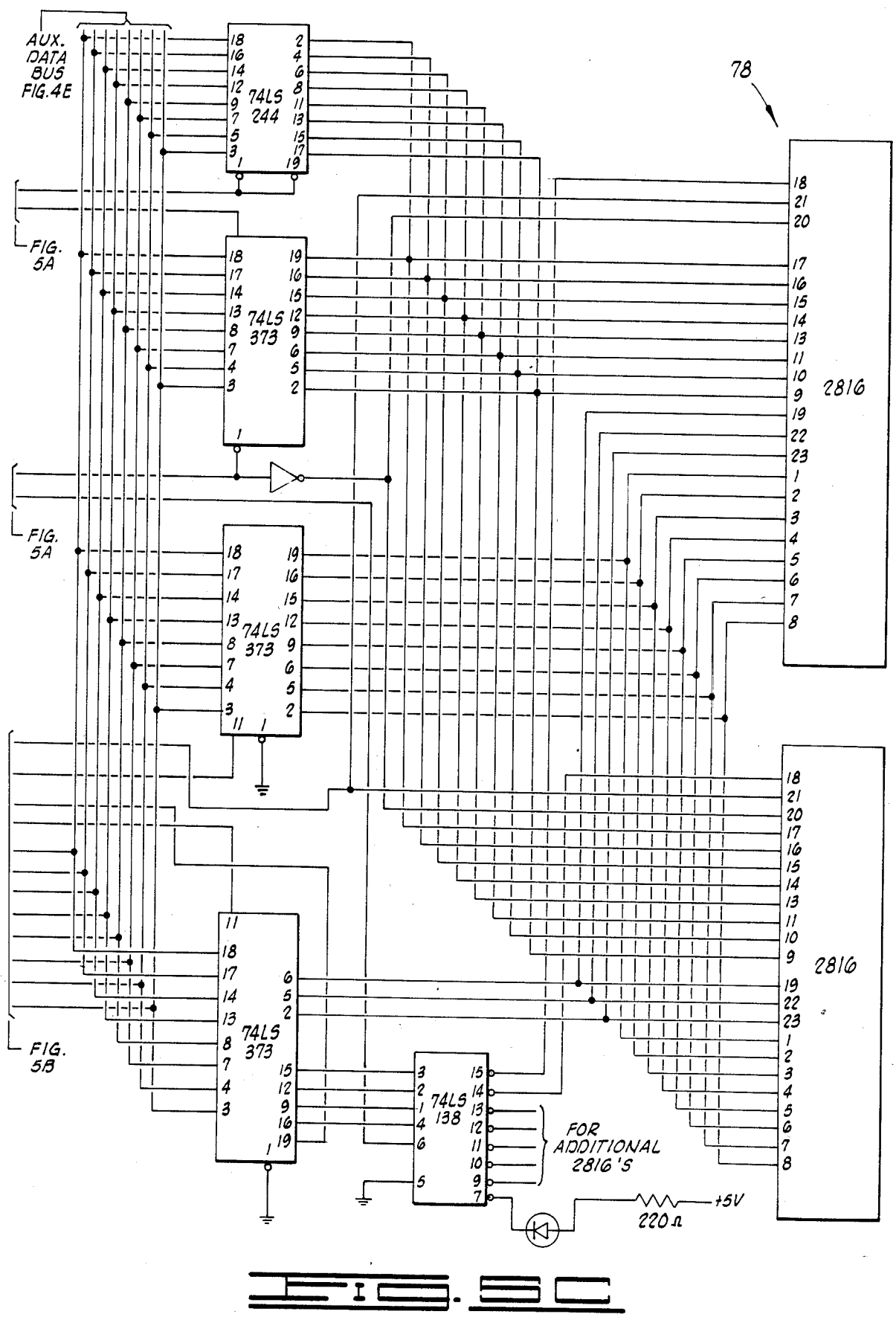

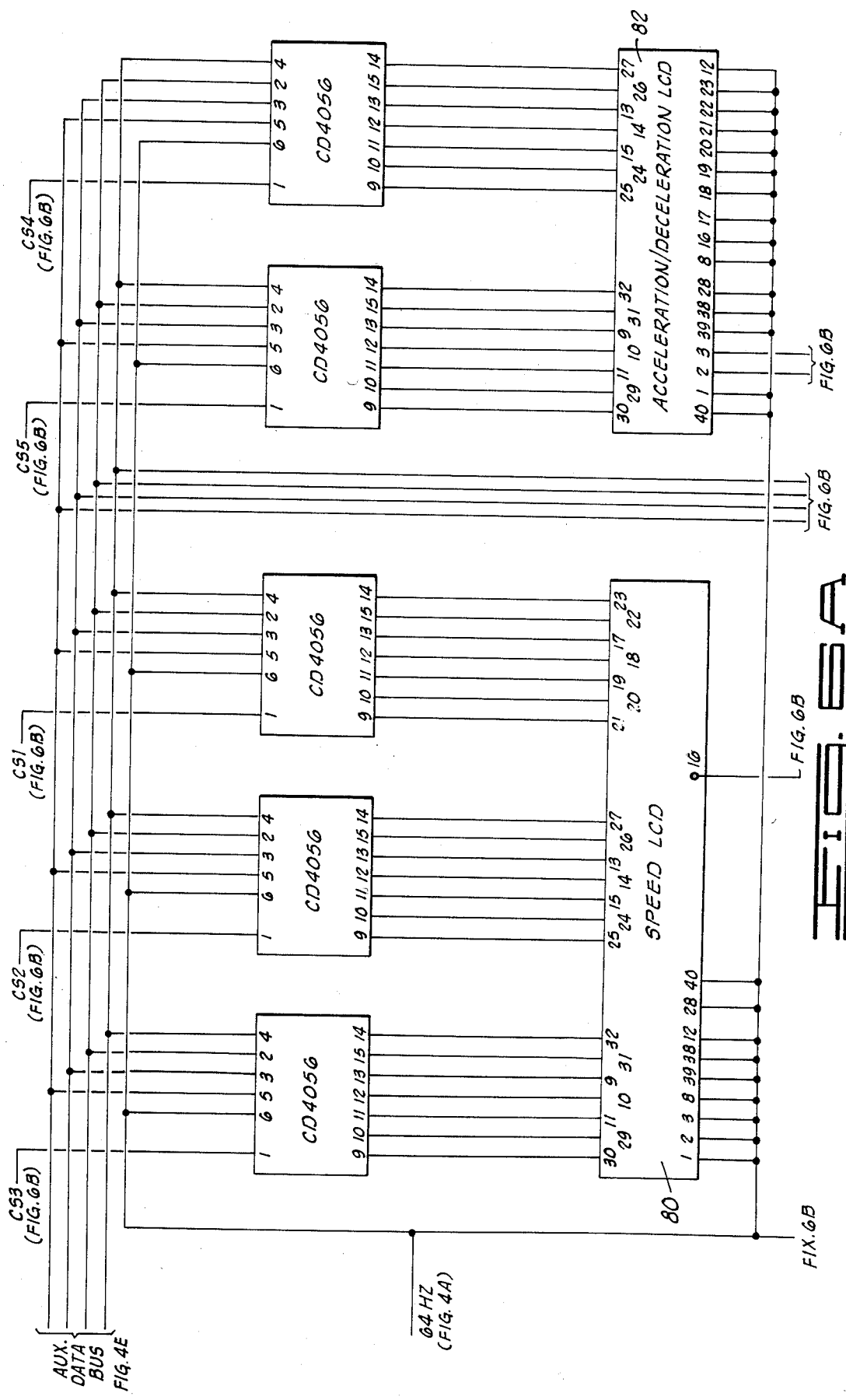

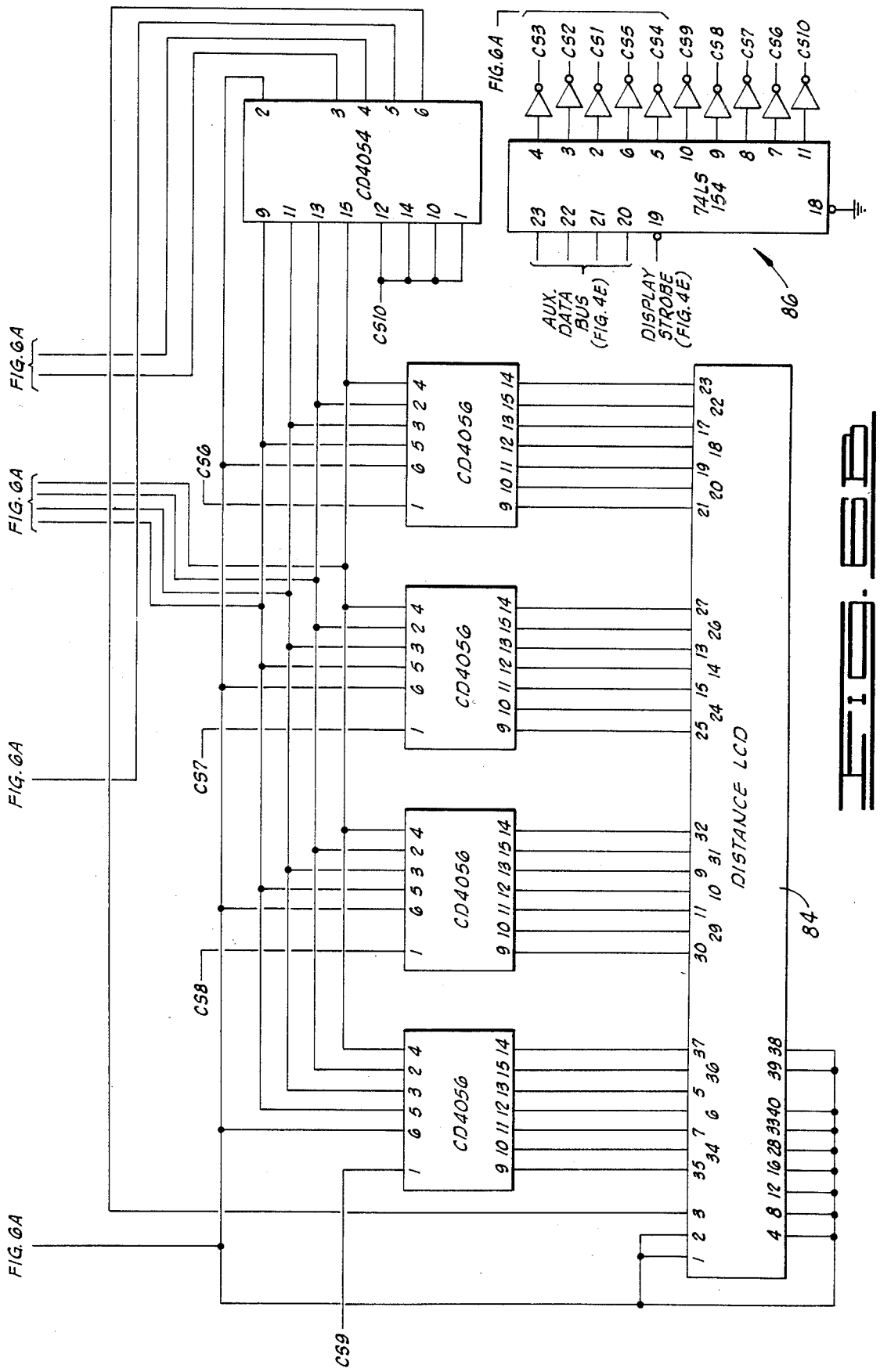

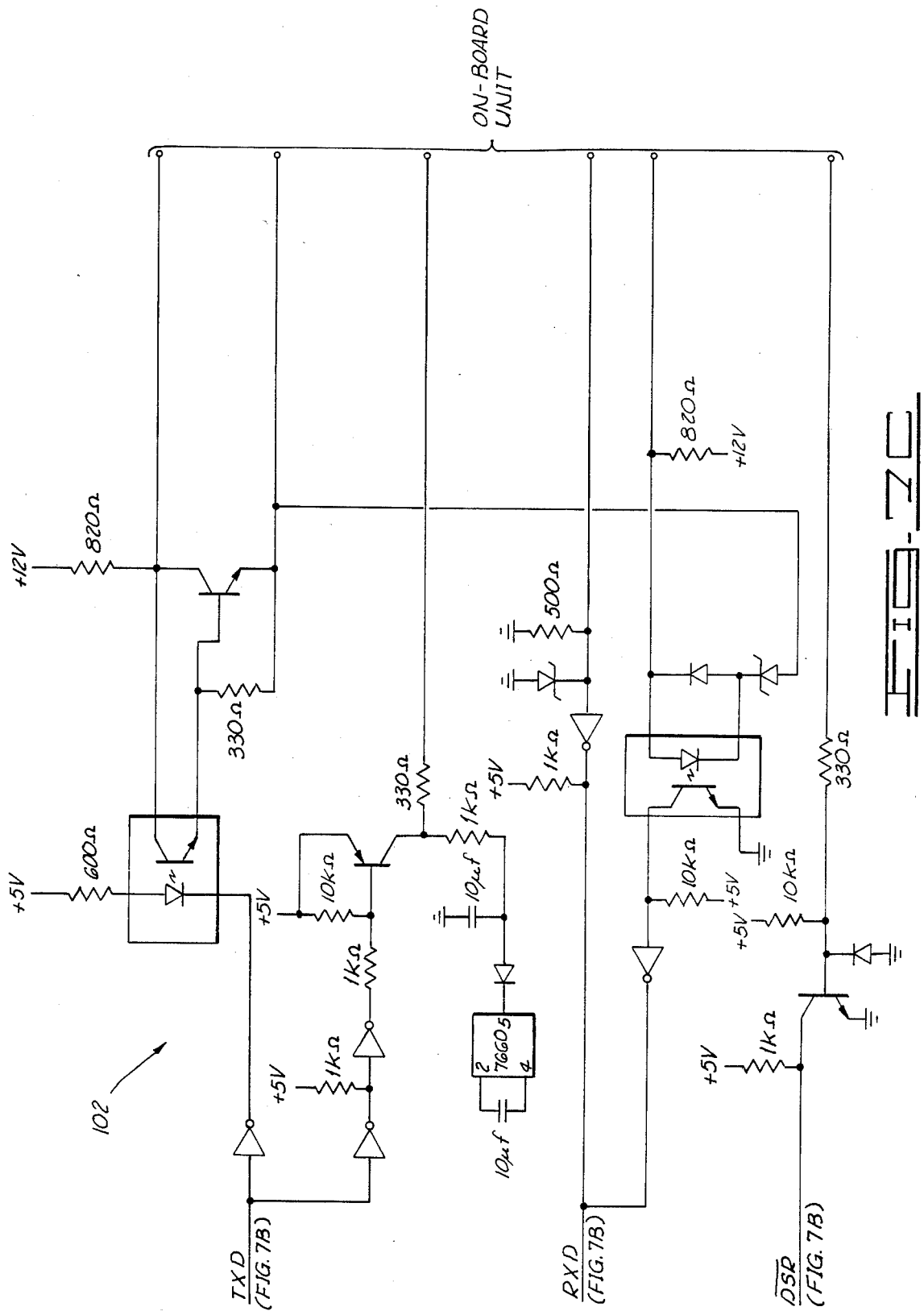

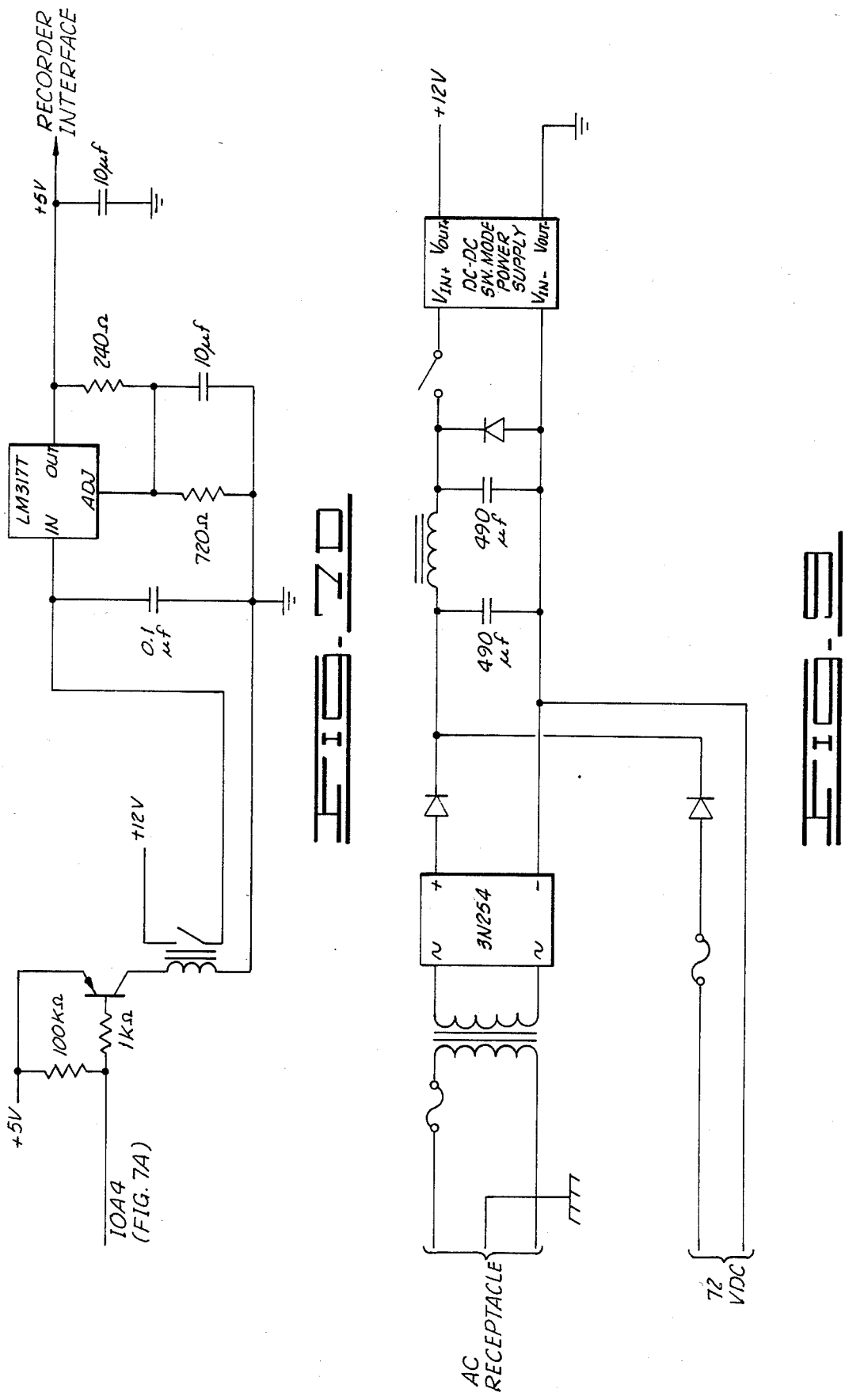

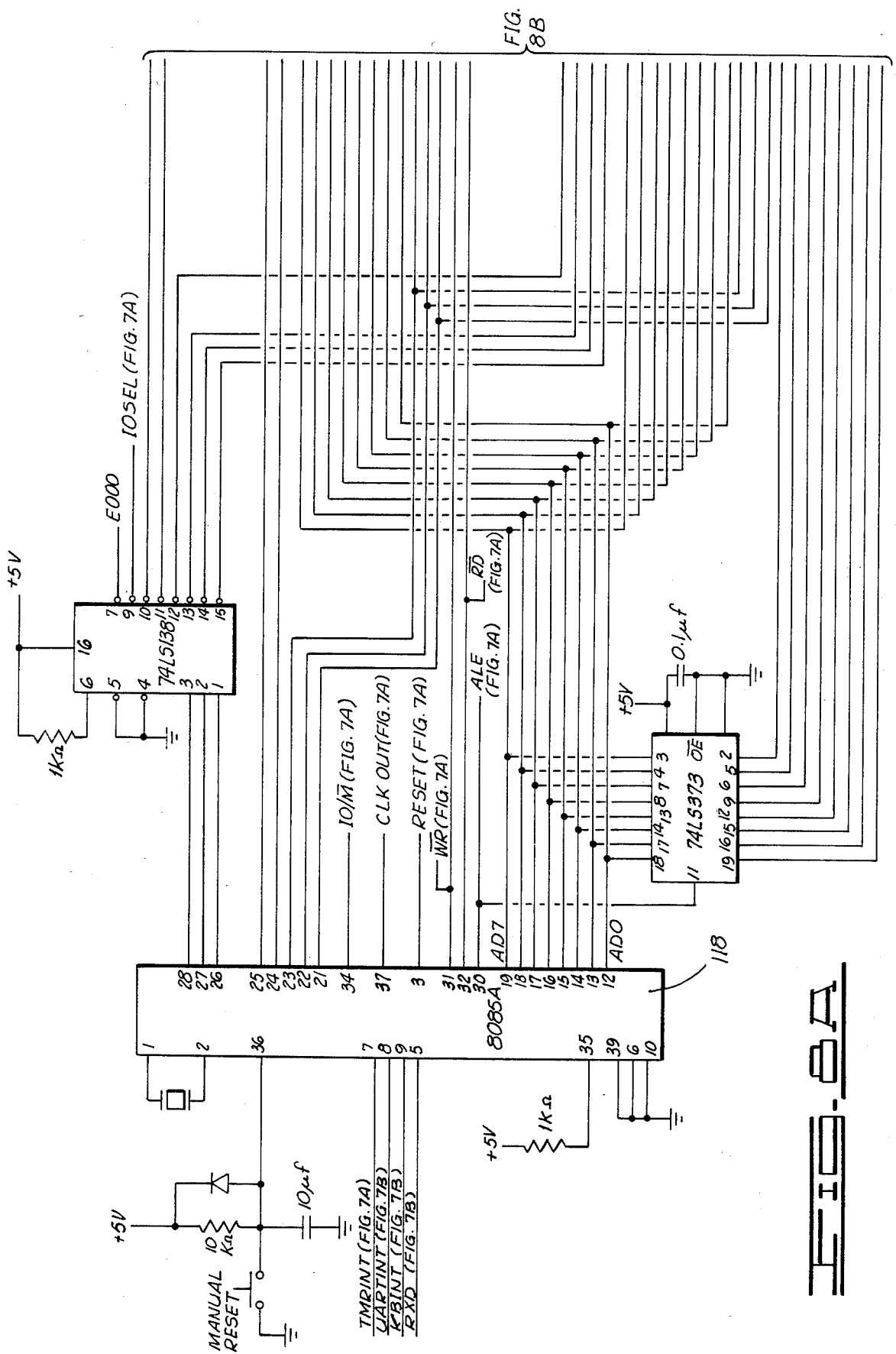

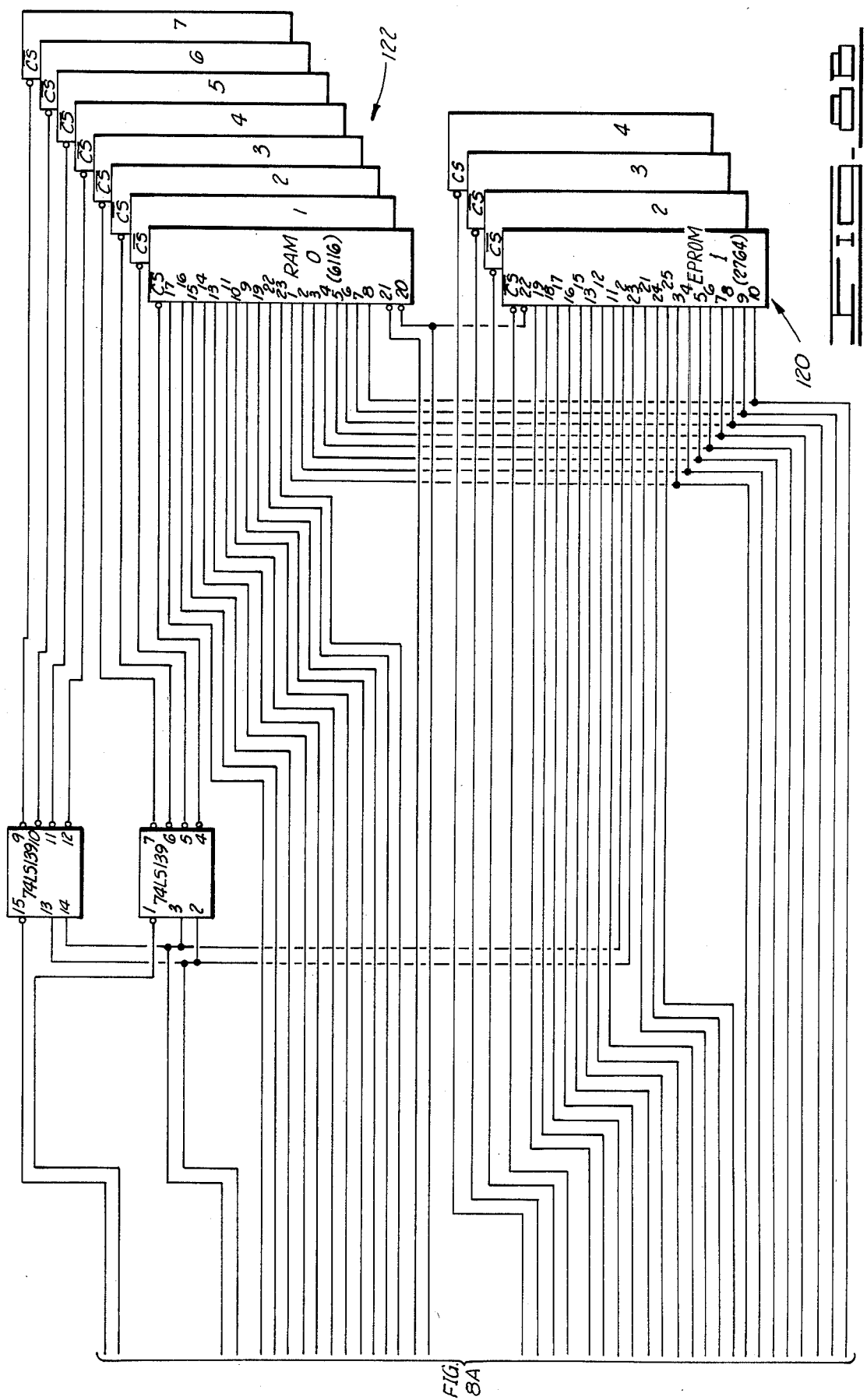

4,561,057

APPARATUS AND METHOD FOR MONITORING MOTION OF A RAILROAD TRAIN

This invention relates generally to apparatus and methods for monitoring the motion of a railroad train and more particularly, but not by way of limitation, to apparatus and methods for determining the speed, the rate of change of the speed, and the distance traveled of a train, for retaining such data within a non-volatile memory located on the train, and for offloading the data from that memory to a memory located in a portable unit which can be subsequently connected to a printer or other data display device for recording or displaying the data.

For purposes of safe and efficient operation of a railroad train, it is important that the train engineer know the manner in which the train is moving. To know the manner in which the train is moving, the engineer must know the speed at which the train is moving, the rate at which the speed is changing (i.e., the acceleration or deceleration), and the distance which the train has moved from a selected location.

The engineer must, of course, know the present speed of the train to insure that it is being maintained within safe and legal limits.

Knowledge of the acceleration/deceleration is also important because it enables the engineer to know the speed toward which the train is changing and the rate at which the change is occurring. Because the engineer cannot physically detect, or "feel," slight changes in speed of the train, the engineer needs some device which tells him the acceleration (i.e., rate of speed increase) or deceleration (i.e., rate of speed decrease). For example, when a train crests a hill, the engineer should try to maintain a zero rate of speed change to prevent the train from running away and to minimize forces on its descent.

To enable the engineer to know when the end of the train has passed a certain point, such as a railroad crossing, it is also important for the engineer to have information regarding the distance which the train has traveled. This is especially important today because of the trend toward eliminating cabooses (and the personnel located therein) from trains. Without personnel located at the end of the train or some other means for advising the engineer of the exact location of the end of the train, the engineer will not be able to accurately determine where the end of the train is relative to the surrounding terrain.

We are aware that various means for indicating the speed of a train have been proposed and/or developed. These speedometers have generally been of either the electro-mechanical or the mechanical type. The electro-mechanical types are analog devices which operate off a signal generated by an axle alternator transducer. The mechanical types are similar to speedometers found in automobiles.

Although these prior devices may be functional, they do have shortcomings. Prior analog devices have needle meters which indicate the speed; however, the needles of such meters oscillate, thereby preventing accurate readings of the speed. Such analog types also have calibration problems arising from the shocks and vibrations inherent in a moving railroad train. These prior types of speedometers also fail to detect slow speeds such as those below three miles per hour. This is an important shortcoming in several situations, such as during a coal loading operation where the train moves slowly as it is being filled with coal. These prior devices also do not detect and compensate when wheel slippage between the wheels of the train and the track occurs. These prior devices also do not simultaneously indicate the acceleration/deceleration and the distance traveled.

Besides being important to apprise the engineer of the real time speed, acceleration/deceleration and distance traveled of the train, it is important to maintain a continuous record of such data so that management and maintenance personnel can properly assess the manner in which the train has been operating. This need has been recognized and attempts have been made to meet it. Mechanical recorders utilizing disks which rotate in correspondence with train movement and which are inscribed by an implement moved by a mechanical speedometer are known. Strip chart recorders are also known. Information on the train operation has also been stored on magnetic tape and in electronic memory, such as random access memory. These storage media have such limitations as limited storage space, limited retention times without adequate backup power supplies, and extended transfer times in copying the data from one storage device to another.

The present invention overcomes the above-noted and other shortcomings of the prior art by providing a novel and improved apparatus and method for monitoring the motion of a railroad train. The present invention gives real time displays of speed, acceleration/deceleration, and distance. The present invention also indicates when a selectable distance has been traveled by the train. These parameters are digitally calculated and displayed so that accurate, steady displays of the data are given.

The present invention also maintains a history of the detected data and stores it in a non-volatile memory to prevent the loss of the stored data when a power outage or interruption occurs. The data can be transferred from the non-volatile memory to another memory for subsequent displaying or printing via a device located away from the train.

The accuracy of the data developed by the present invention is enhanced by means for detecting and correcting for wheel slippage.

Relatively large quantities of information can be stored because generally only changes in detected data are stored.

The present invention is also able to detect and display very low speeds of the train.

The apparatus of the present invention broadly includes electronic means for determining speed, acceleration/deceleration and distance traveled data of the railroad train. The electronic means includes storage means for storing data and means for placing in the storage means a history of the speed, acceleration/deceleration and distance traveled data.

The electronic means also includes means for selecting a distance, means for initiating a measurement of the distance the train travels, and means for comparing the measurement of distance with the selected distance and for generating a signal when the measurement equals the selected distance.

The electronic means also includes means for receiving a signal correlated to the motion of the train, means for computing the actual speed of the train in response to the signal, means for determining the difference between two different ones of the computed actual speeds, and means for transferring the difference to the storage means. These elements permit the present invention to store data obtained over a longer period of time than would be possible if each calculated speed were stored.

To monitor for wheel slippage, the electronic means also includes means for receiving signals correlated to the motion of the train, means for computing the actual speeds of the train at different times from these signals, and means for determining when the computed actual speeds have variances above predetermined values over predetermined time periods.

The apparatus also broadly includes portable means, connectible to the electronic means and including a first communication port, for copying the history from the storage means and for transferring the history to the communication port which is alternatively connectible to a display means for visually displaying the history.

Therefore, from the foregoing it is a general object of the present invention to provide a novel and improved apparatus and method for monitoring the motion of a railroad train. Other and further objects, features and advantages of the present invention will be readily apparent to those skilled in the art when the following description of the preferred embodiment is read in conjunction with the accompanying drawings.

FIGS. 3A-3E are schematic circuit diagrams of the power supply and input/output conditioning means shown in FIG. 2.

FIGS. 4A-4E are schematic circuit diagrams of the controller means of the train-located (on-board) unit shown in FIG. 2.

FIGS. 5A-5D are schematic circuit diagrams of the recorder means shown in FIG. 2.

FIGS. 6A-6B are schematic circuit diagrams of the display means shown in FIG. 2.

FIGS. 7A-7D are schematic circuit diagrams of the input/output interface means of the portable unit shown in FIG. 2.

FIGS. 8A-8B are schematic circuit diagrams of the controller means of the portable unit shown in FIG. 2.

FIG. 9 is a schematic circuit diagram of the power supply means of the portable unit shown in FIG. 2.

Figure 1:
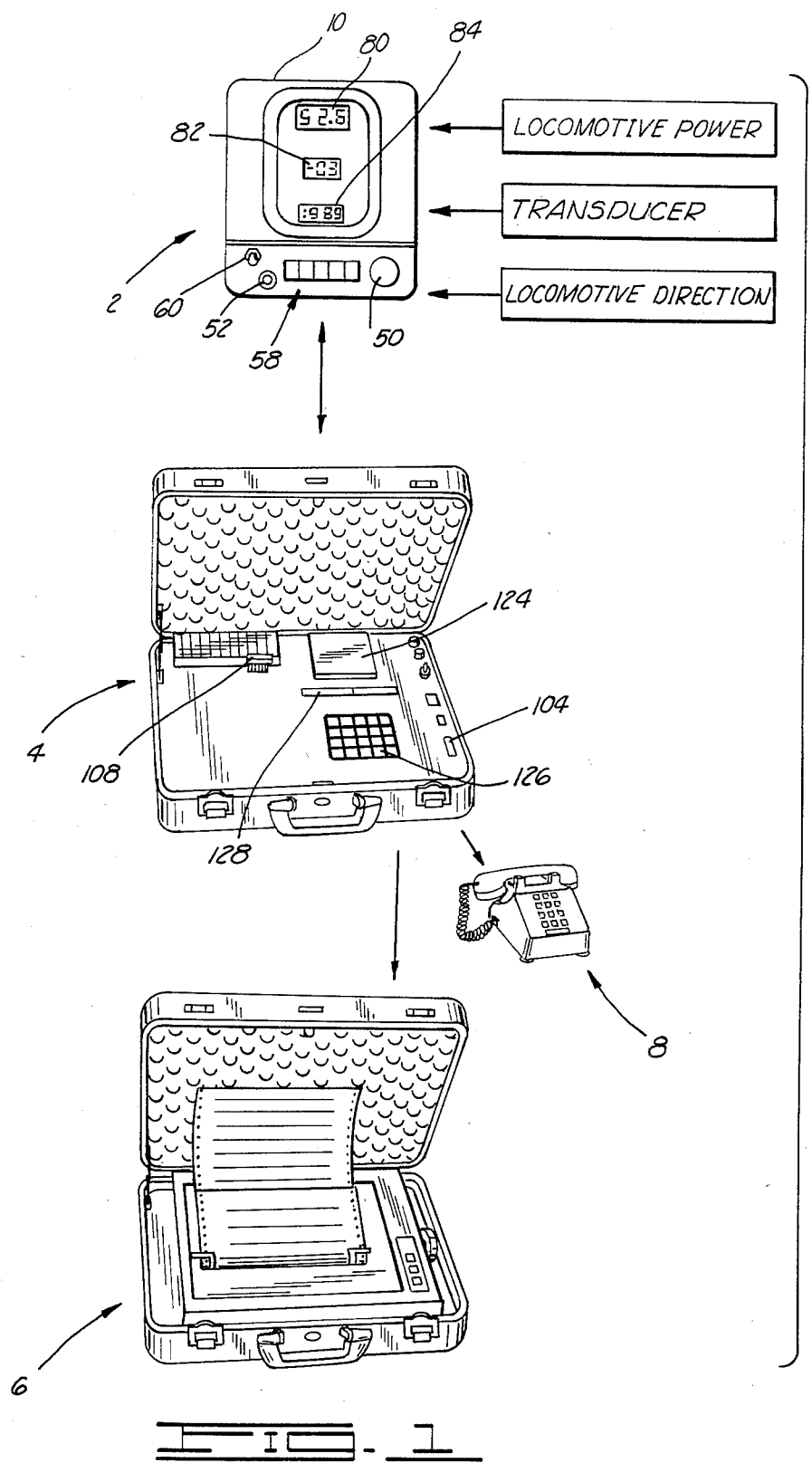
FIG. 1 is an illustration of a preferred embodiment of the present invention.

With reference to the drawings a preferred embodiment of the present invention will be described. FIG. 1 is an illustration of an external view of the present invention, which includes an on-board unit 2 and a portable unit 4, shown in association with external peripheral equipment (e.g., a printer 6 or a telephone 8 and associated modem) with which the invention can be used. The illustrated embodiment is specifically for use with a railroad train (not shown), such as one including one or more diesel-electric locomotives.

Figure 2:
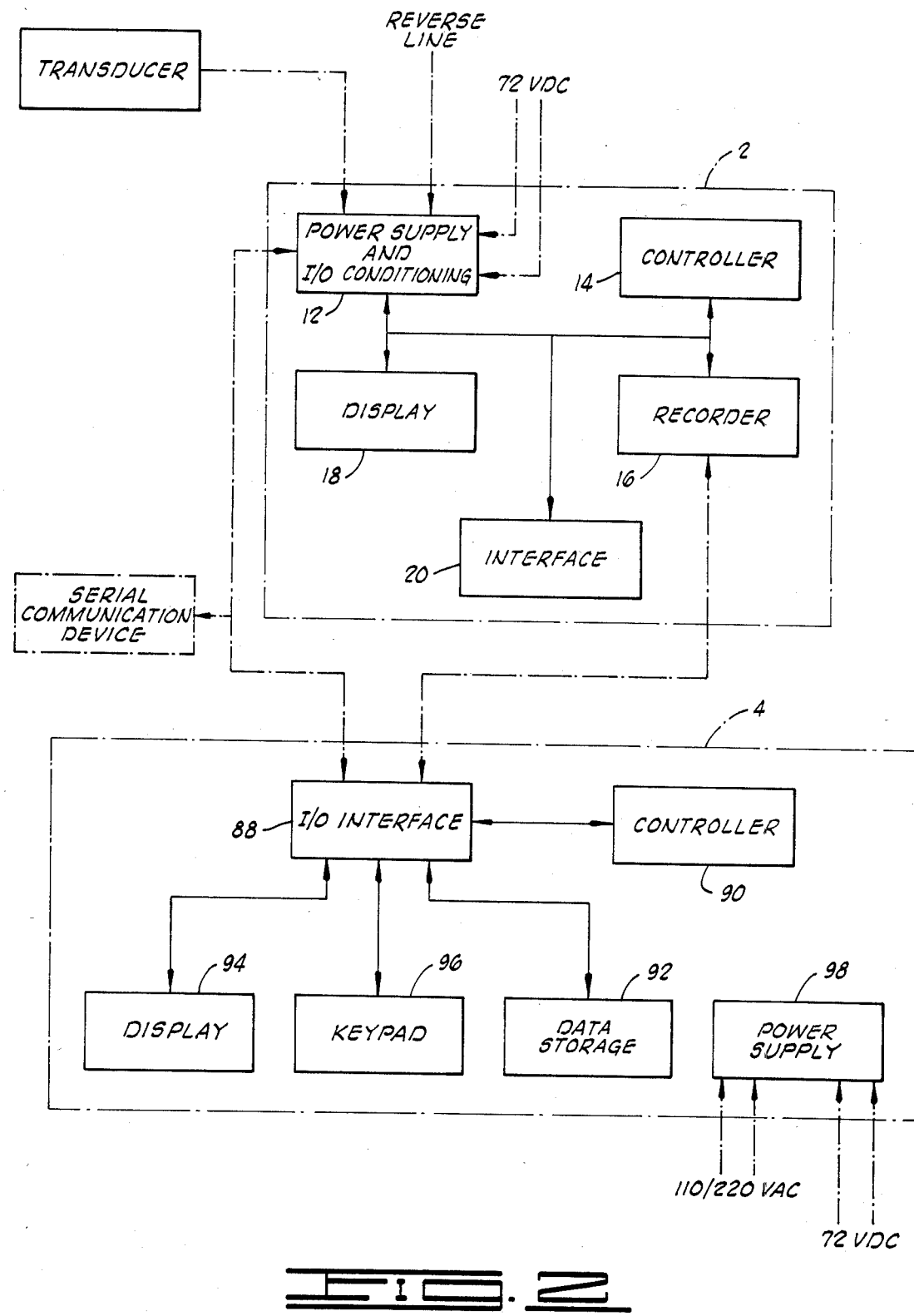
FIG. 2 is a functional block diagram of the preferred embodiment of the present invention.

The railroad train with which the preferred embodiment is contemplated to be used includes an electrical train line, which is part of a locomotive's electrical control circuits as known to the art. Included within the train line is an electrical conductor designated as the reverse line for carrying an electrical signal indicating when the locomotive reverses direction, thereby signifying travel in a forward direction and a reverse direction. The train line also includes power lines by which connections are made to a seventy-two volt DC power supply. These two portions of the train line are external means for providing inputs to the on-board unit 2 as illustrated in FIGS. 1 and 2. Another external means is a circuit for receiving an overspeed indication, such as by means of a switch closure.

Another external means to which the present invention is connectible is a means for generating an electrical signal representative of, or correlated to, the motion of the train. In the illustrated preferred embodiment described more particularly hereinbelow, this means includes a transducer which generates a signal having a frequency proportional to the speed of the train. In the preferred embodiment the transducer is an axle alternator which attaches to a splined axle of a locomotive of the train and which generates a predetermined number (e.g., four) of pulses per revolution of the axle. One specific type of transducer which is suitable is manufactured by Freightmaster and provides a constant signal level that is independent of the speed of the train. Other types of suitable transducers can be used as known to the art.

As an alternative to the axle alternator transducer, the means for generating an electrical signal representative of the motion of the train may include a radar transducer of a suitable type as known to the art. The radar transducer provides a signal which is proportional to the absolute ground speed and which is not subject to distortions that may arise in an axle alternator transducer from wheel slippage.

The electrical signal representative of the motion of the train is provided to the present invention which is shown in FIGS. 1 and 2 to broadly include both the on-board unit 2, which provides a means for determining and displaying to the train engineer the speed, acceleration/deceleration and distance traveled data of the railroad train, and the portable unit 4, which provides a means for copying the data from the on-board unit 2. The on-board unit 2 is contemplated to be mounted and used in the railroad train to advise the engineer, on a real time basis, of the speed, the acceleration or deceleration, and the distance traveled of the train. Although the on-board unit 2 can be carried on and off the train with little difficulty, it is contemplated to generally remain on the train. On the other hand, the portable unit 4 is designed primarily for portable use so that it can be carried on or off the train to transfer data from the on-board unit 2 to remote locations. For example, the portable unit 4 can be carried onto the train and connected to the on-board unit 2 to transfer data stored in a memory of the on-board unit 2 to a memory of the portable unit 4. Once data have been transferred to and stored in the portable unit 4, the portable unit 4 can be physically displaced relative to the on-board unit 2, and its memory, (such as by being hand-carried) to enable the transferred data to be printed or otherwise displayed at a location which is remote from the train and the on-board unit 2.

With reference to FIGS. 1-6B, the preferred embodiment of the on-board unit 2 will be described. The on-board unit 2 is an electronic device having a solid-state construction which reduces the need for frequent adjustments, tuning or calibration as is necessary in analog devices. The accuracy of the operation of the on-board unit 2 is monitored by an internal diagnostic system each time power is applied to the device.

As shown in FIG. 1, the on-board unit 2 includes a suitable housing 10. The housing 10 is of any suitable type which is mountable in a suitable location in the train, such as in the locomotive within visual access of the engineer. Within the housing 10 are contained several functional elements as shown in FIG. 2. These functional elements include power supply and input-/output interface means 12, controller means 14, recorder means 16, display means 18, and distance measurement interface means 20.

The power supply and input/output interface means 12 includes logic level power means 22, connectible to the power lines of the train line, for providing a regulated voltage to the on-board unit 2. By being connected to the train power lines, the on-board unit 2 utilizes the nominal seventy-two volt DC train voltage source; however, the present invention is electrically isolated therefrom by means of a suitable DC-DC converter known to the art as indicated in the schematic circuit diagram of FIG. 3A.

Figure 3A:
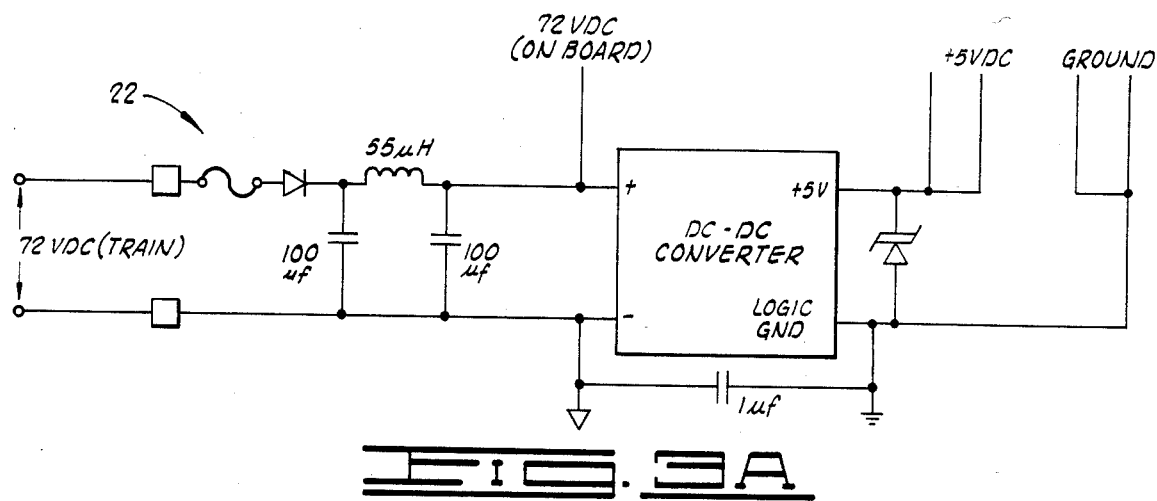
Figure 3B:
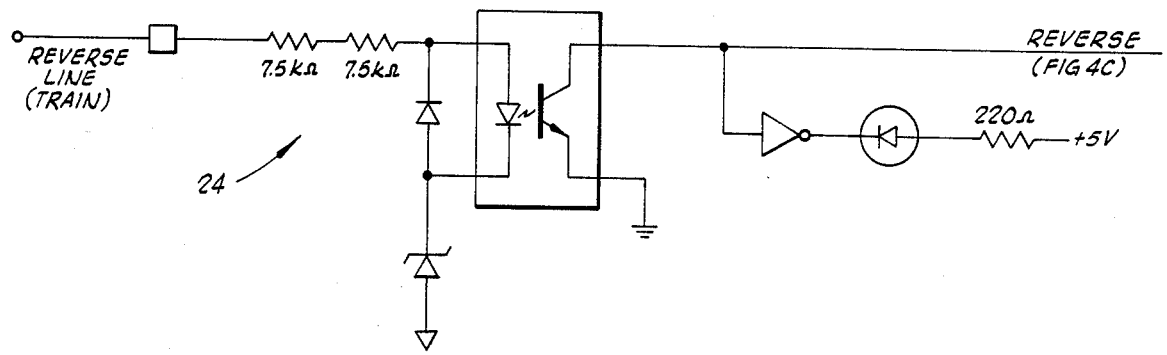

The means 12 further includes means 24 for receiving the directional signal from the reverse line of the train line and converting it into an input signal having a digitally compatible form (e.g., magnitude and rise/fall times). This means is illustrated in FIG. 3B. The present invention operates so that the direction having the majority of the distance traveled is assumed to be the forward direction in case the reverse line is connected backwards.

Figure 3C:
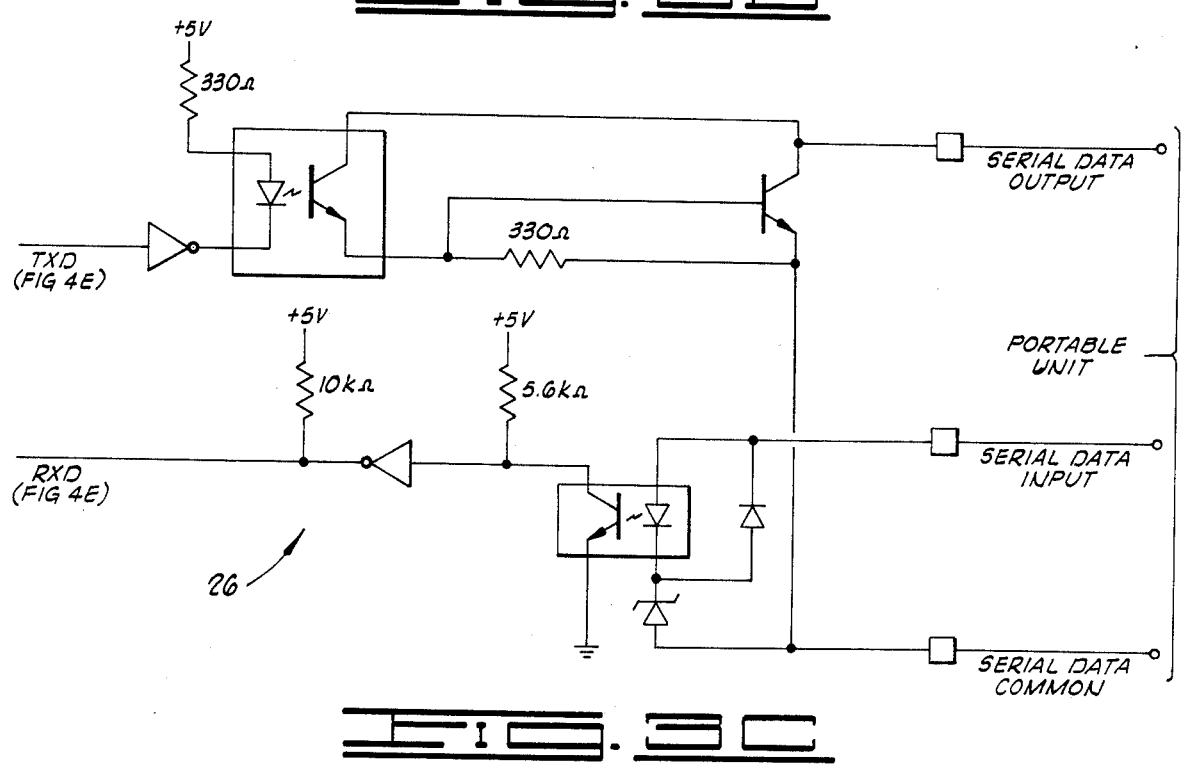

The means 12 also includes bi-directional optically isolated serial communication means 26 for providing a communication path between the on-board unit 2 and the portable unit 4. The preferred embodiment of this communication port is schematically shown in FIG. 3C. The communications which occur through this port will be more particularly described hereinbelow.

As an optional feature, the means also includes a switch closure circuit means 28 designed to provide an overspeed output control signal when a predetermined speed level is exceeded by the actual speed of the train. The switch closure circuit is shown in FIG. 3D.

The power supply and input/output interface means 12 further includes motion sensor input means 30 for receiving the electrical signal representative of the motion of the train and converting it into an input signal having a digitally compatible form (e.g., magnitude and rise/fall times). This means is shown in FIG. 3E to include axle transducer ports 32, 34, each for receiving the output signals from a respective axle transducer. A radar transducer port 36 is also provided so that a radar transducer can be used. These signals are isolated and converted into digital signals which are provided to the controller means 14 via the line labeled "TRANSDUCER" in FIG. 3E. The specific one of the converted transducer signals which is provided is selected by means of the specified "TRANSDUCER SELECT" signals and a multiplexer 38. The "TRANSDUCER SELECT" signals are generated by electrically connecting ones of the terminals labeled "TRANSDUCER TYPE SELECT JUMPER TERMINALS" in an appropriate manner as would be apparent to one skilled in the art.

It is to be noted that more detailed descriptions of the circuitry disclosed in FIGS. 3A-3E are not believed necessary because the drawings themselves provide sufficient detail to those skilled in the pertinent arts. Similarly, detailed descriptions of subsequently discussed drawings will be omitted where such detail is not necessary for an adequate disclosure. It is also to be noted that in the drawings, the unlabeled boxes (such as the two to the left in FIG. 3A) represent ferrite beads as known to the art.

From the foregoing it is apparent that the power supply and input/output interface means 12 generally provides means for interfacing with external means, which external means in the described preferred embodiment includes the reverse line and power lines of the train line, the portable unit 4, the transducer means for generating the electrical signal which is proportional to the motion of the train (in particular, the electrical signal has a frequency proportional to the speed of the train), and the overspeed output means.

The reverse line signal, the electrical signal representative of the motion of the train (i.e., the signal from the transducer means), and any instructions received through the serial communication means 26 are utilized by the controller means 14 to determine the speed, the rate of change of the speed (i.e., acceleration or deceleration), and the distance traveled data of the railroad train. The basic information for these determinations comes from the transducer signal which is received into the controller means 14 via the circuitry 40 illustrated in FIG. 4A. A predetermined timing signal from a timing circuit 42 is also provided to the circuitry 40. By appropriate control of a multiplexer 44, either the transducer signal or the timing signal is utilized by the circuitry 40 to provide an input to an integrated circuit port (peripheral interface) chip 46.

FIG. 4B discloses overspeed signal circuitry 47 which is actuated when the controller means determines the actual speed of the train exceeds a predetermined maximum speed level. When this event occurs, an "OVERSPEED" signal is provided to the switch closure circuit means 28 shown in FIG. 3D. When the "OVERSPEED" signal is generated, an indicator light-emitting diode 48 is illuminated.

FIG. 4B also discloses circuitry 49 for providing actuation signals to energize a buzzer 50 and a lamp 52 disposed on the front panel of the housing 10 of the on-board unit 2 as illustrated in FIG. 1. The buzzer 50 is sounded and the lamp 52 is illuminated when the train travels a preselected distance as will be further described hereinbelow.

The controller means 14 also utilizes information which is manually entered through switches shown in FIG. 4C. A first set of switches 54 is used for entering the wheel diameter for the specific train in which the invention is to be used. The diameter is entered in binary coded decimal format. This is the only adjustment which is necessary prior to proper operation of the present invention. Another set of switches 56 is included for permitting manual entry of a maximum speed limit which determines the speed at which the "OVERSPEED" signal is generated.

FIG. 4C also shows circuits for receiving the inputs from a set of five thumbwheel switches 58 mounted on the front panel of the housing 10. A circuit for receiving the inputs from a distance reset switch 60 (see FIG. 1) mounted on the front panel of the housing 10 is also shown in FIG. 4C. This circuit also receives the "TRANSDUCER SELECT" and "REVERSE" signals.

Figure 4D:
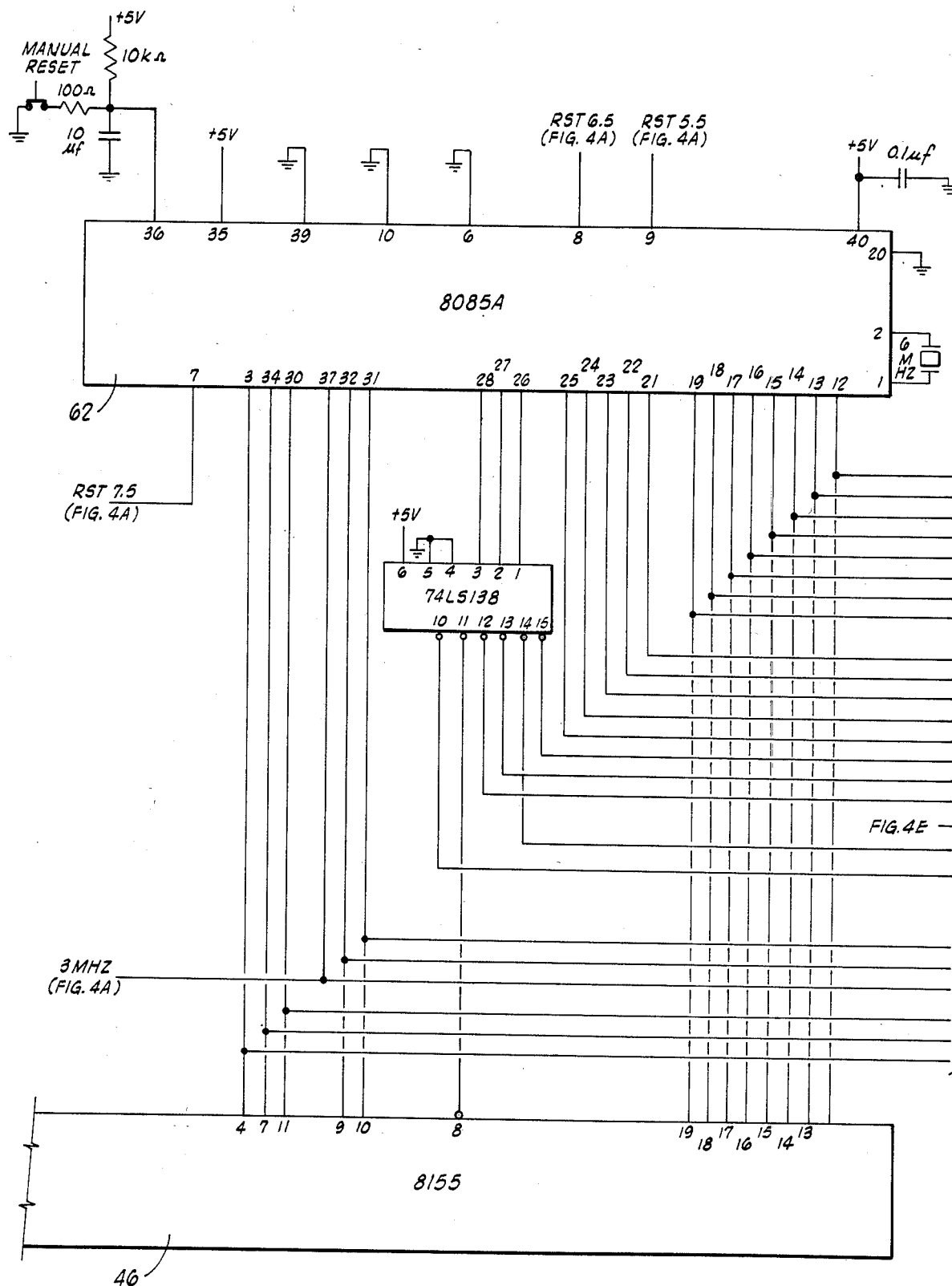
Figure 10:
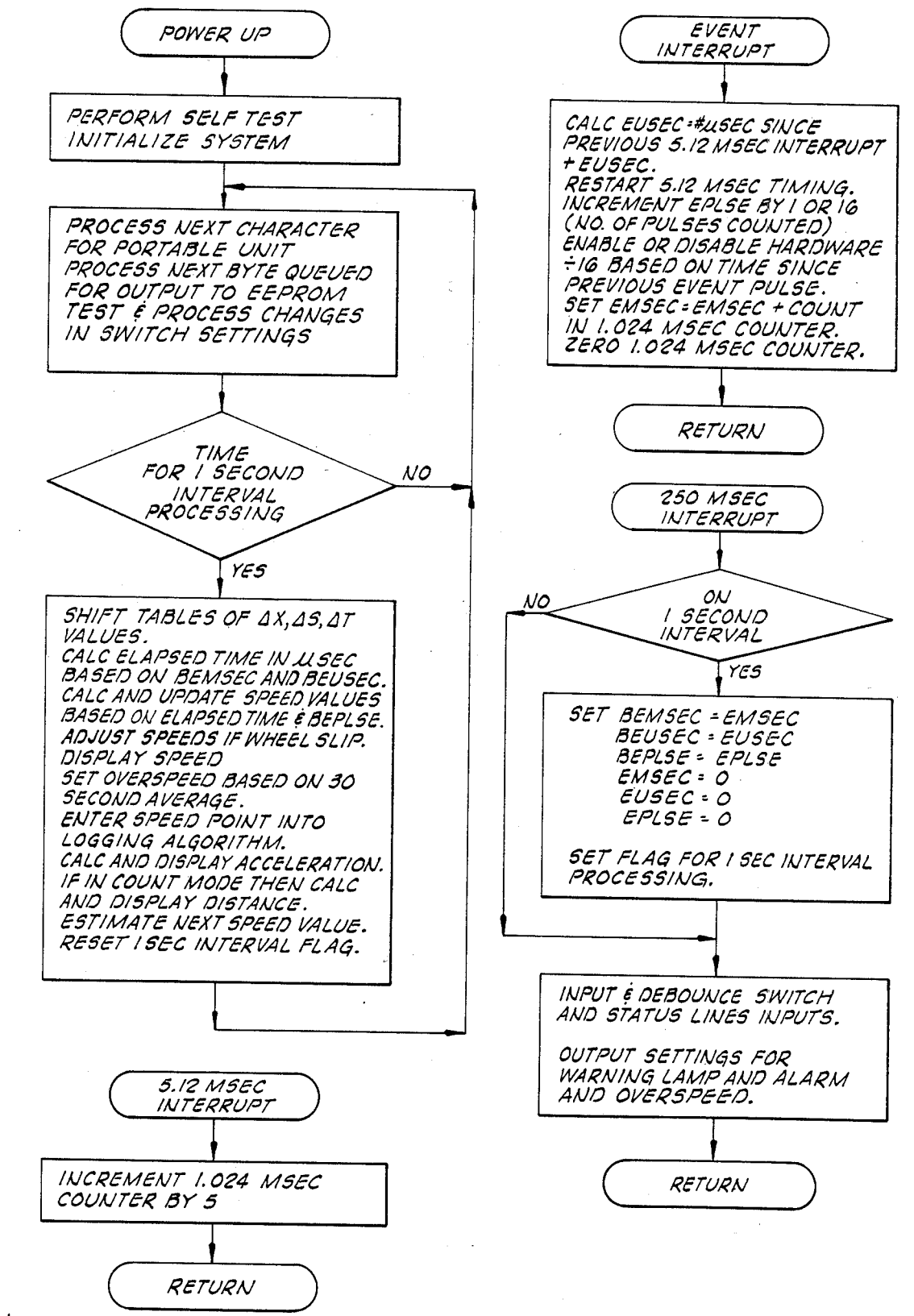
FIG. 10 is a flow chart of the program of the preferred embodiment on-board unit.

The aforementioned signals or information received by the controller means 14 is transferred to a computer means via the port chip 46, which computer means includes in the preferred embodiment a microprocessor 62 and accompanying memory, such as programmable read only memory (PROM) 64 and random access memory (RAM) provided by the port chip 46, a memory chip 66 and another port chip 68, as illustrated in FIGS. 4D-4E. An operating system (flow chart of which system is shown in FIG. 10) of the on-board unit 2 is contained within the PROM 64, whereas working data storage space for the microprocessor 62 is contained primarily within the chips 46 and 68 with the chip 66 providing space for expansion in the preferred embodiment. The operating system and the microprocessor 62 provide means for computing the speed, acceleration/deceleration and distance traveled of the train based on the electronic signal representative of the motion of the train and a timing signal generated by the timing circuit 42. In the preferred embodiment the computer means computes the forward or backward speed of the train within 0.1 mile-per-hour increments and within a range between zero and 99.9 miles per hour. The rate of change of the speed is computed within one mile per hour per minute increments. Computations of distance can be made up to 19,999 feet. It is to be noted that the preferred embodiment can also be programmed to operate with metric units.

The microprocessor 62 and the operating system also provide means for comparing a selectable distance measurement as entered via the thumbwheel switches 58 with the actual measurement of distance computed by the computer means and for generating the "DISTANCE BUZZER" and "DISTANCE LAMP" signals when the actual measurement equals the selected distance.

The microprocessor 62 and operating system also provide means for storing computed data and time information in the random access memory (particularly chips 46 and 68 in the preferred embodiment) of the computer means.

The microprocessor 62 and operating system also provide means for determining a difference between two different computed speeds and for determining when the difference is greater than zero. When the difference is greater than zero, the difference is stored in the random access memory. By detecting only differences and storing only differences, the quantity of data relative to time which can be stored is greater than in a system which simply stores the data from each computed event. Thus, the present invention in effect compresses the raw data into a desired compressed portion of differences and stores, in general, only the compressed portion. Because the relative, or differential, time at which the change occurs is also stored, the intervening events can be subsequently reconstructed.

The microprocessor 62 and the operating system also provide means for determining when the actual computed speeds have variances greater than a predetermined value over a predetermined time period so that slippage of the wheels of the train can be detected when such greater variances occur.

The microprocessor 62 and the operating system also more generally provide means for electrically communicating with the various other elements of the on-board unit. This communication occurs through the port chip 46 and the port chip 68. A universal synchronous/asynchronous receiver/transmitter (USART) chip 70 shown in FIG. 4E provides an external interface to the portable unit 4.

The controller means 14 communicates with the recorder means 16 via the port chip 68 and the control signals specified in FIG. 4E. These control signals from the controller means 14 are specifically provided to the timing and control circuitry of the recorder means 16 shown in FIG. 5A. A power-on reset signal is generated by circuitry 72 also shown in FIG. 5A.

One of the control signals is used for accessing a sense/status buffer chip 74 shown in FIG. 5B. The inputs to the chip 74 are primarily from the timing and control circuitry shown in FIG. 5A and from program pulse detection and control circuitry 76 shown in FIG. 5B. The circuitry 76 detects power interruptions or outages so that a present "write" cycle of data storage is terminated and future ones prevented while the power interruption or outage is being detected. Upon a power-up (which is detected at pin 36 of the microprocessor 62), the controller means 14 transfers electrically encoded information, which signifies that a power outage has occurred, to a non-volatile memory 78 (see FIG. 5C) of the recorder means 16. The transfer occurs via the auxiliary data bus identified in FIGS. 4E and 5C.

In the preferred embodiment the non-volatile memory 78 includes electrically erasable programmable read only memory chips which retain stored data even after power is totally disconnected or cut off from the on-board unit 2. In addition to retaining the aforementioned power outage information, the non-volatile memory 78 also retains the motion information computed by the controller means 14. This motion information is continually updated until a power interruption or outage occurs. In the preferred embodiment the motion information is specifically the speed and time data because only these data are needed to reconstruct the entire history of the speed, acceleration/deceleration and distance. Therefore, the contents of the non-volatile memory comprise a history (or the basis for the history) of the detected events associated with the train motion. This history includes a record of any power downs which occur during the recording period. The data maintained in the non-volatile memory are in electrically encoded format as known to the art.

In the preferred embodiment the non-volatile memory 78 is mounted on a printed circuit board which supports the integrated circuit chips containing the memory circuits (more particularly, the circuits shown in FIGS. 5A-5D). The printed circuit board is removably retained within the housing 10 so that the board, and the associated memory 78, can be removed from the housing 10 and connected to the portable unit 4 for directly transferring the contents of the memory 78 to the portable unit 4. When electrical power is removed from the memory 78, such as when the printed circuit board is removed from the housing 10, the memory can retain the contents for several years.

As the computer means of the controller means 12 is making its computations of the actual speed, acceleration/deceleration and distance traveled of the train in response to the electrical signal received from the transducer or other signal generating means, the computer means provides the computations as output to the display means 18 for visually displaying the real time parameters for use by the engineer. These visual readouts assist the engineer in controlling the speed and acceleration/deceleration of the train to, for example, reduce in-train forces and prevent lading damage and train separations.

The display means 18 includes the circuitry shown in FIGS. 6A and 6B. Numeric indicators, including liquid crystal displays (LCDs) 80, 82 and 84 (see FIGS.

6A-6B) having electroluminescent backplanes, are mounted on the front panel of the housing 10 as shown in FIG. 1. The LCD 80 includes three digits and a decimal point; the LCD 82 includes two and a half digits and a minus sign; the LCD 84 includes four and a half digits. The appropriate digits are selected by a chip select multiplexer circuit 86 shown in FIG. 6B.

Also visible and accessible from the front panel of the housing is the distance measurement interface means 20. This interface means includes the thumbwheel switches 58 which provide the train engineer with mechanical means for selecting a distance measurement against which the actual distance traveled by the train is to be compared. The means 20 also includes the switch 60 which provides means for commanding the computer means of the controller means 14 to initiate a measurement of the distance the railroad train travels. This command is given over the "RESET" line shown in FIG. 4C. When the distance counting is to be stopped, the switch 60 is moved to a stop position so that a suitable signal is provided over the "STOP" line shown in FIG. 4C. When the switch 60 is in neither the reset nor the stop positions, it is in a count position wherein the computer means is permitted to display the distance the train has traveled since the last reset signal. The means 20 still further includes the buzzer 50 and the lamp 52 which provide indicator means for indicating when the measured distance the train has traveled from the time of initiation equals the selected distance entered in the thumbwheel switches 58.

With reference to FIGS. 1, 2 and 7A-9, the preferred embodiment of the portable unit 4 will be described. The portable unit 4 is constructed to operate in two modes. One of the modes is as a data collector in which the portable unit 4 is connected to the on-board unit 2 or to the recorder memory board, in substantial collocation therewith, for transferring the data stored in the memory 78 to the portable unit 4. The second mode is as a data processing unit to utilize the transferred data for computing the speed, distance, acceleration/deceleration and time at which these events occurred and to place them in the proper format for printing or display via a peripheral device connected to the portable unit 4. These modes are implemented by means of input/output interface means 88, controller means 90, data storage means 92, display means 94 and keypad means 96 shown in FIG. 2. These elements are energized by power supply means 98.

Figure 7A:
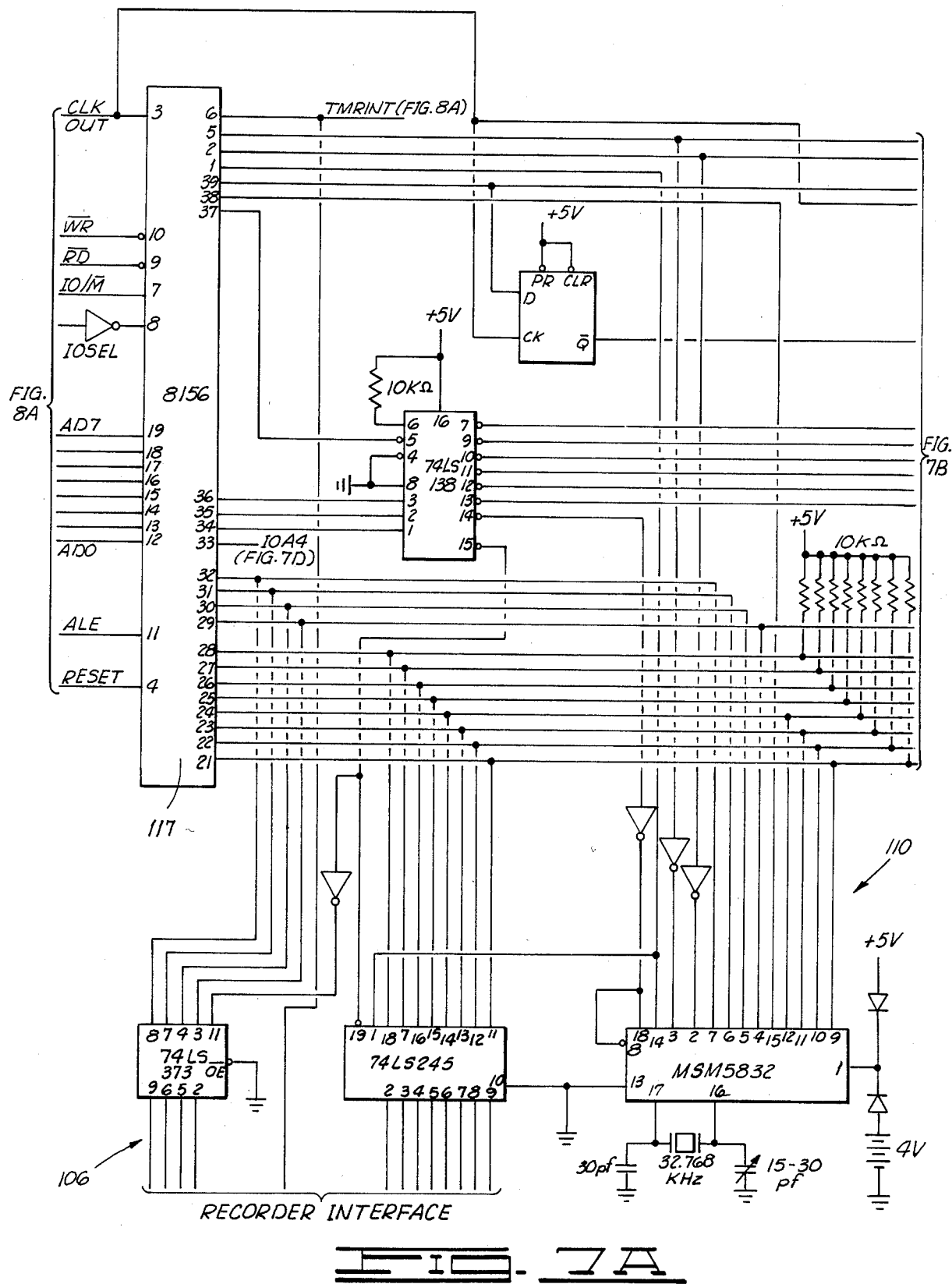
Figure 7B:
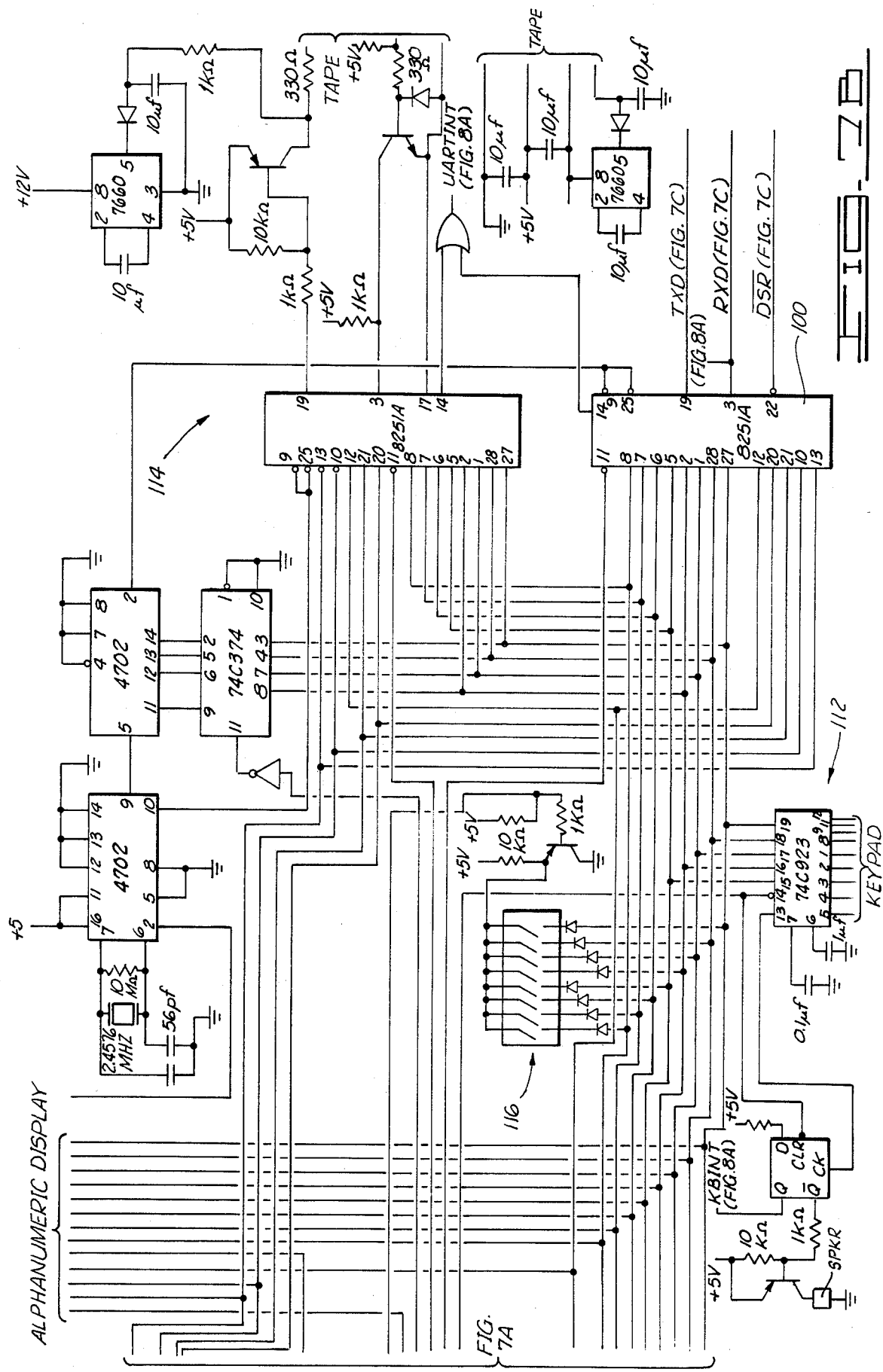

The input/output interface means 88 includes a communication port having a USART chip 100 shown in FIG. 7B and interfacing circuitry 102 shown in FIG. 7C. The interfacing circuitry 102 terminates in a suitable connector 104 (see FIG. 1) of a type as known to the art. The connector 104 is connectible by suitable cabling means to the serial communication means 26 of the on-board unit 2 or to another peripheral device (such as the printer 6 or telephone 8) which is compatible with the communication port of the portable unit 4. In the preferred embodiment the communication ports are RS 232 compatible. This permits the portable unit interface communication port to be connected to printers, modems, CRT display units and the like as known to the art. This communication port of the portable unit 4 transfers data serially.

The input/output interface means 88 also includes another communication port 106 (see FIGS. 7A and 7D) which is directly connectible to the memory board of the recorder means 16 of the on-board unit 2. This connection is made in the preferred embodiment at a suitable connector 108 (shown in FIG. 1) which is connected to the "RECORDER INTERFACE" lines shown in FIGS. 7A and 7D. This other communication port provides means for transferring the electrically encoded data within the memory 78 of the recorder means 16 directly to the memory of the portable unit 4.

The input/output interface means 88 still further includes a real time clock means 110 (see FIG. 7A) for maintaining a date and time of day so that the time history transferred to the portable unit 4 can be converted to the date and time of day at which the recorded events occurred.

As shown in FIG. 7B, the input/output interface means 88 also includes means for connecting with an alphanumeric display (not shown) of the display means 94. Also shown in FIG. 7B as a part of the interface means 88 is circuitry 112 for receiving inputs from the keypad means 96 and for generating a keyboard interrupt (KBINT) signal in response thereto.

Further illustrated in FIG. 7B is another serial communication circuit 114. The circuit 114 provides a communication interface with the data storage means 92.

Switches 116 shown in FIG. 7B are used for system configuration purposes which do not constitute a part of the present invention claimed herein.

The aforementioned elements of the interface means 88 communicate with the controller means 90 of the portable unit 4 via a peripheral interface chip 117 shown in FIG. 7A.

Data transfers between the portable unit 4 and the devices connectible thereto are controlled by the portable unit controller means 90 which includes a microprocessor 118 (see FIG. 8A) and suitable memory, such as erasable programmable read only memory (EPROM) 120 and random access memory (RAM) 122 (see FIG. 8B). The microprocessor 118 and a program (flow chart shown in FIG. 11) stored in the EPROM 120 interact with the USART 100 via the peripheral interface chip 117, and the microprocessor 62 and program of the on-board unit 2 interact with the USART 70 and the communication means 26 of the on-board unit, to control the transfer between the two when the two are suitably connected. Alternatively, the recorder board containing the memory 78 can be connected to the connector 108 and the microprocessor 118 and the program of the portable unit 4 can alone control the transfer of data. In either event, data transfers of several hours of recorded data can be completed in the preferred embodiment in only seconds (e.g., less than two minutes in the preferred embodiment).

The data transferred from the on-board unit 2 to the portable unit 4 are first retained in the RAM 122 of the portable unit. Thereafter, the microprocessor 118 and associated program provide means for transferring the data stored in the RAM 122 to the data storage means 92. In the preferred embodiment the data storage means includes a magnetic mini-cassette tape recorder 124 (see FIG. 1) of a type known to the art. Once data have been recorded on a tape in the tape recorder 124, transfers to other peripheral equipment, such as the printer 6 or a modem to which the telephone 8 is connected, can be made. Such transfers are made by first disconnecting the connector 104 from the on-board unit 2 and then connecting the connector 104 to the peripheral device.

The operation of the portable unit 4 is controlled by an operator through the keypad means 96 and the display means 94. The keypad means of the preferred embodiment includes a twenty-key keypad 126, as illustrated in FIG. 1, of a type as known to the art. The keypad is interfaced via the circuitry schematically illustrated in FIG. 7B.

Instructions and other information are displayed to the operator via an alphanumeric liquid crystal display 128 forming the preferred embodiment of the display means. The display is interfaced with the electronic circuitry via the circuit shown in FIG. 7B.

The portable unit 4 is powered by a regulated power supply which is responsive to either the DC voltage from the train or the AC voltage from an ordinary 110-volt AC outlet. The power supply circuit of the preferred embodiment of the portable unit is shown in FIG. 9.

Figure 12:
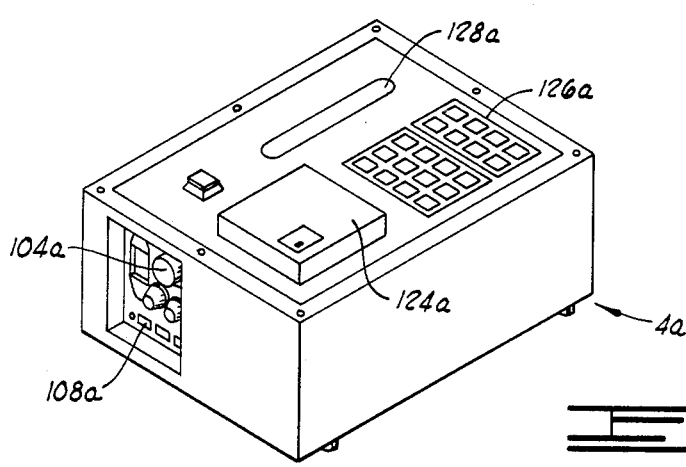
FIG. 12 is an external view of another embodiment of the portable unit.

Another embodiment of the portable unit 4 is shown in FIG. 12. This embodiment has a different external appearance but is otherwise similar as indicated by like reference numerals followed by the letter "a."

It is to be noted that the specific component values and numbers disclosed in the drawings are not to be taken as limiting the present invention because suitable equivalents can, of course, be substituted and yet not depart from the scope of the invention.

Figure 11:
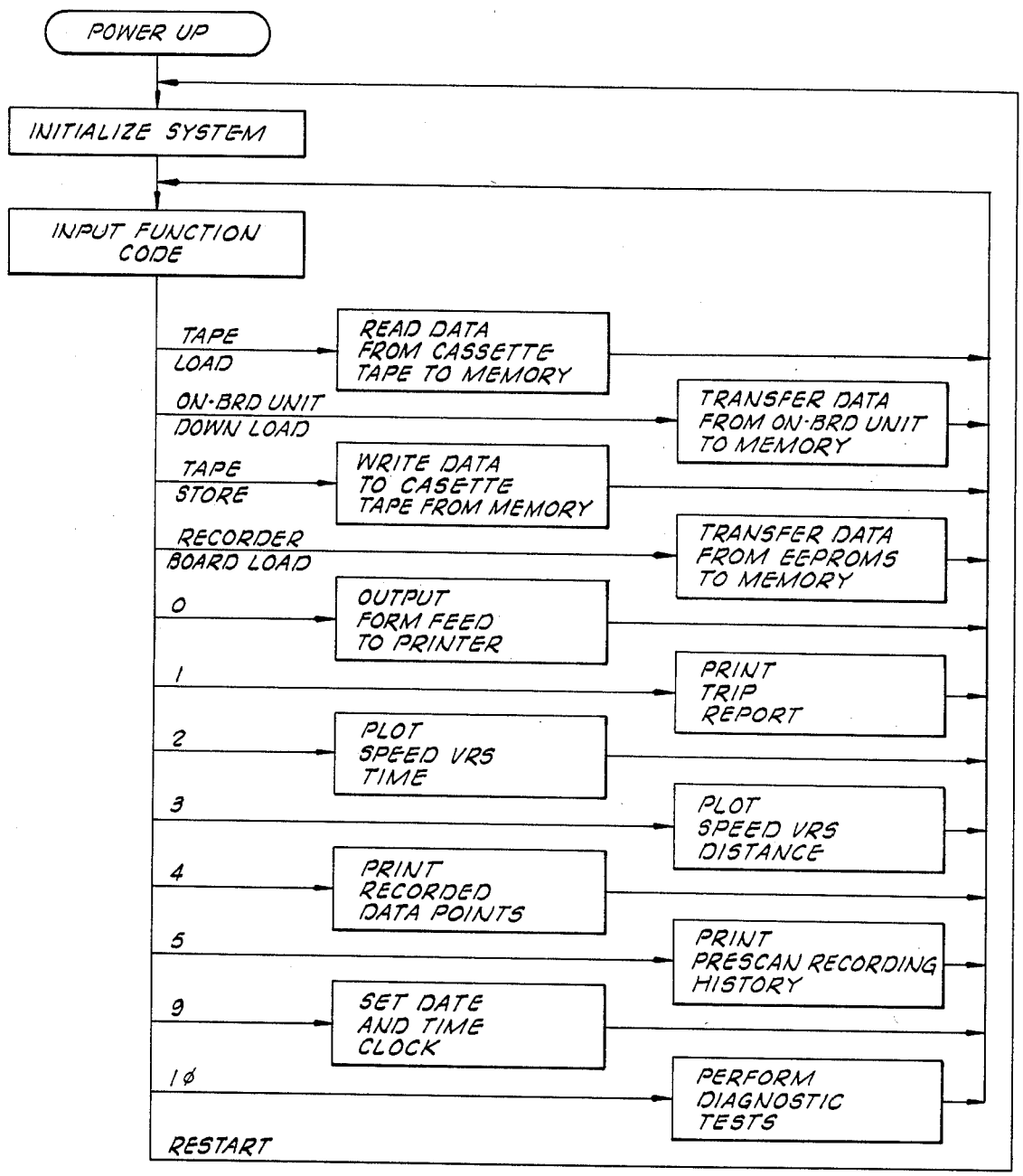
FIG. 11 is a flow chart of the program of the preferred embodiment portable unit.

The operation of the preferred embodiment of the present invention is controlled by the on-board unit operating system disclosed in FIG. 10 and the portable unit operating system disclosed in FIG. 11. The general functions performed by these systems will be briefly described.

When the on-board unit 2 receives a signal from the transducer means for generating a signal in response to the motion of the train, the computer means of the controller means 14 determines the real time speed, acceleration/deceleration and distance traveled (it is to be noted that in the preferred embodiment the distance is always being computed, but it is displayed only when the switch 60 is in the count position). When these computations are made, they are transferred to the numeric displays 80, 82 and 84 for informing the train operator or engineer. The computer means of the controller means 14 also utilizes the speed information to compute changes in the speed, which changes are then stored in the random access memory (e.g., in chips 46 and 68). The corresponding time data derived from the clock circuitry 42 are also stored in the random access memory. This process is repeated to continually update the visual display and to compile a history of the speed and time. Thus, the on-board unit 2 provides real time readouts of speed, acceleration/deceleration and distance which enable the operator to safely and efficiently operate the train. For example, the engineer can use the acceleration information to detect slight grades, or when starting off, to operate the train below a certain level to keep drawbar forces low.

To utilize the distance display 84 and the distance measurement interface means 20 in one manner of operation, the engineer, when the lead locomotive reaches a convenient landmark, moves the switch 60 to its reset position and then to its count position. This commands the computer of the on-board unit 2 to initiate a new count of the distance traveled from the point at which the reset occurred. When the engineer is advised that the end of the train has reached the starting landmark, the switch is moved to the stop position. This freezes the number shown in the distance display 84, which number represents the train length in feet or other unit in which the on-board unit 2 can be programmed. This number indicating the train length is manually entered into the thumbwheel switches 58 to provide the selectable distance against which future distance measurements will be compared. The distance measuring function of the computer means of the controller means 14 can then be repeated by moving the switch to the reset position and then releasing it to the count position at any point on the track. When the end of the train passes the point at which the reset occurred, the indicator light and buzzer will be actuated, thereby alerting the engineer that his train has cleared the selected point.

This operation utilizing the distance measurement feature of the computer means and the distance measurement interface means of the on-board unit 2 is useful, for example, on sidings, through slow orders, over hilly terrain, and in foul weather with poor visibility. For example, when a train is cresting a grade, the engineer may want to reduce the throttle when he knows one-half of the train has passed the crest. It is also useful to know when the entire train has passed a crossing, for example.

It is to be noted that distances other than the train length can be entered into the thumbwheel switches 58 and that the distance count which is shown in display 84 can be allowed to run freely to act as an odometer.

The data that are computed and initially retained in the random access memory of the controller means 14 are periodically transferred to the EEPROM 78 of the recorder means 16 until a power outage occurs. The data which are stored and transferred to the recorder means 16 are not the absolute speed, acceleration/deceleration and distance traveled data continuously computed and displayed to the engineer. Rather, the stored data include both the changes in the computed absolute speeds and the associated relative, or differential, times at which the changes occurred. In the preferred embodiment, once each hour the absolute speed value is also stored to provide a means for later checking the validity of the recorded difference values. Absolute speeds are also periodically recorded if no speed changes are detected for predetermined time periods. For example, in the preferred embodiment a recordation occurs every six minutes if the detected absolute speed is zero, and a recordation occurs every one minute, eight seconds if a constant speed other than zero is detected for that time period. In this way, a lesser quantity of data can be retained without losing the ability to later reconstruct the actual speeds, accelerations/decelerations, distances traveled and times at which these events occurred. The timing can be computed because relative, or differential, times are recorded along with the differential speeds.

In computing the speed values which are displayed to the engineer, the microprocessor 62 and operating system monitor the computed actual speed values to determine if there is a speed change anomaly which would indicate wheel slippage. This anomaly is detected by a sufficient speed increase over a short period of time. The particular speed increase which is sufficient to indicate wheel slippage can be variable so that at high speeds a small speed change might indicate wheel slippage whereas at low speeds the same small speed change may not indicate wheel slippage. When such an anomaly is detected, the resultant computed speed figure is compensated. This feature is pertinent to the preferred embodiment which responds to a signal from a transducer mounted on an axle of the locomotive.

When the contents of the on-board unit 2 are to be transferred for evaluation by management, maintenance or other personnel, the portable unit 4 is used in one of two ways to transfer the contents of the EEPROM 78 of the on-board unit 2 to the memory of the portable unit 4. One manner of operation is to connect the serial communication port including the elements 100 and 102 of the portable unit 4 to the serial communication means 26 of the on-board unit 2 and to then conduct data transfers via this conduit under control of the two controller means of the on-board and portable units.

A second method of transferring the data is to connect the recorder interface 106 to the recorder board by first removing the recorder board from the on-board unit 2 and plugging it into the connector 108 on the portable unit 4. The controller means 90 of the portable unit 4 then conducts the data transfers.

In the preferred embodiment, up to approximately eighteen hours of data can be recorded in the EEPROM 78 shown in FIG. 5C; this can be expanded by adding additional EEPROM chips as indicated in FIG. 5C. This quantity of data can be transferred in seconds to the memory of the portable unit 4.

Once the data transfer from the memory of the on-board unit 2 to the memory of the portable unit 4 has occurred, the controller means 90 of the portable unit can then compute the speed, acceleration/deceleration, distance traveled and date and time of day information for purposes of displaying on a video screen, printing onto a hard copy, or transmitting over a telephone line, for example. The date and time of day information are computed by assuming that the most recent entry of the history transferred from the EEPROM 78 occurred at the current time of the transfer or at the time the power to the EEPROM 78 of the on-board unit was lost. This assumed point is given a corresponding time and date as maintained in the portable unit 4, and then previous events in the history can be assigned corresponding times and dates by backtracking from the assumed point with the recorded relative, or differential, times.

When the data are displayed or printed by peripheral devices, they can be presented in a variety of formats. For example, they can be presented in tabular form having a column for each of the relative location, time, speed, and acceleration/deceleration events. A chart-type plot of the train events keyed to speed, location and time can also be produced by the preferred embodiment of the present invention. Various other formats can also be utilized.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for monitoring the motion of a railroad train, comprising:

on-board electronic means, connectible to an electrical train line of a railroad train for retention on the railroad train, for determining speed, rate of change of speed and distance traveled data of the railroad train, said electronic means including:

display means, visible to an operator of the railroad train when said electronic means is connected to the train line, for visually displaying speed, rate of change of speed and distance traveled data;

first memory means for storing information in said electronic means;

first computer means, responsive to a signal representative of the motion of the railroad train, for computing and displaying through said display means real time speed, rate of change of speed and distance traveled data and for transferring to said memory means information related to said real time data so that a history of said information is compiled from which said real time data can be later analyzed; and first communication means, responsive to said computer means, for providing a first communication path over which said information can be transferred from said electronic means; and portable means, connectible to said electronic means, for copying, either directly from said first memory means or through said first communication means, said history from said electronic means when said electronic means is retained on the railroad train and for transferring said history to a location remote from the railroad train and said electronic means, said portable means including:

hand-carried means for transporting said portable means;

second communication means, mounted in said hand-carried means, for connecting with said first communication means;

third communication means, mounted in said hand-carried means, for connecting with said first memory means;

second memory means, mounted in said hand-carried means, for storing information received through either said second communication means or said third communication means;

fourth communication means, mounted in said hand-carried means and connected to said second memory means, for providing a communication path to said second memory means; and second computer means, mounted in said hand-carried means and connected to said second, third and fourth communication means, for controlling a selectable one of said second and third communication means to receive said history through the selected one thereof and for controlling said fourth communication means to send said received history to said second memory means for storage therein, said second computer means selecting said second communication means when said first communication means is connected thereto and said second computer means selecting said third communication means when said first memory means is connected thereto.

2. An apparatus as defined in claim 1, wherein said portable means further includes:

keypad means, mounted in said hand-carried means and connected to said second computer means, for generating control inputs to said second computer means; and alphanumeric display means, mounted in said hand-carried means and responsive to said second computer means, for displaying instructions to an operator of said portable means.

3. An apparatus for monitoring the motion of a railroad train, comprising:

electronic means for determining speed, rate of change of speed and distance traveled data of a railroad train, said electronic means including:

housing means for mounting in the train;

storage means for storing electrically encoded information, said storage means including:

non-volatile electronic memory means for maintaining stored data therein when electrical power is removed from said memory means; and support means for removably retaining said non-volatile electronic memory means in said housing means; and computer means, retained in said housing means, for entering in said storage means a history of said data; and portable means, connectible to said electronic means, for copying said history from said storage means and for transferring said history to a peripheral device spaced from said electronic means, said portable means including:

portable memory means for storing information;

a first communication port connectible with a selectable one of said computer means and the peripheral device;

means for cooperatively operating with said computer means in said electronic means for transferring said history into said portable memory means through said first communication port from said storage means when said first communication port is connected to said computer means;

a second communication port connectible with said non-volatile electronic memory means when said support means is removed from said housing; and means for transferring said history into said portable memory means through said second communication port directly from said non-volatile electronic memory means when said second communication port is connected to said non-volatile electronic memory means.

4. An apparatus as defined in claim 3, wherein:

said electronic means further includes:

first switch means, mounted in said housing means, for selecting a distance; and second switch means, mounted in said housing means, for commanding said computer means to initiate a measurement of the distance the railroad train travels; and said computer means includes means, responsive to said first and second switch means, for comparing said measurement of distance with said selected distance and for generating a signal when said measurement equals said selected distance.

5. An apparatus as defined in claim 4, wherein said electronic means further includes:

display means, responsive to said computer means, for visually displaying said determined speed, rate of change of speed and distance traveled data; and indicator means, responsive to said signal, for indicating to a train operator when said measurement equals said selected distance.

6. An apparatus as defined in claim 3, wherein:

said electronic means further includes means for receiving an electrical signal correlated to the motion of said railroad train;

said computer means includes:

means, responsive to said electrical signal, for computing the speed, rate of change of speed and distance traveled data of said railroad train;

means for generating a timing signal indicating a differential time at which each event of said computed data occurs relative to other events of said computed data; and means for storing in said non-volatile electronic memory means at least a portion of said computed data and each said differential time associated therewith; and said portable means includes means for receiving each said differential time stored in said memory means and for correlating each said differential time with a signal indicating the actual date and time of day the associated event occurred.

7. An apparatus as defined in claim 3, wherein said portable means further includes:

means for converting said history transferred to said portable memory means into formatted information for displaying magnitudes of the historical speeds, rates of change of speed and distances traveled; and means for transferring said formatted information to the peripheral device when said first communication port is connected to the peripheral device.

8. An apparatus for monitoring the motion of a railroad train having an electrical train line including a reverse line for carrying an electrical direction signal indicating a direction of movement of the train and power lines for providing access to an electrical voltage supply, the railroad train also having means for generating an electrical motion signal corresponding to the motion of the train, said apparatus comprising:

means for converting a motion signal generated from a railroad train into a first input signal having a digitally compatible form;

means for converting a direction signal from a train line of the train into a second input signal having a digitally compatible form;

means, responsive to said first input signal and said second input signal, for determining speed, acceleration and distance traveled information of the train and for providing said information as electrically encoded data;

non-volatile memory means for electronically retaining information;

means for periodically transferring at least a portion of said electrically encoded data to said non-volatile memory means;

portable memory means for being physically displaced relative to said non-volatile memory means;

means, connected to said portable memory means and connectible with said non-volatile memory means, for transferring said electrically encoded data from said non-volatile memory means to said portable memory means when both said memory means are substantially collocated; and means, connected to said portable memory means, for transferring said electrically encoded data from said portable memory means to a display means for visually displaying said speed, acceleration and distance traveled information at a location remote from said railroad train.

9. An apparatus as defined in claim 8, further comprising:

means for selecting a distance measurement;

means for measuring the distance the train travels from a selectable point; and means for indicating when the distance the train travels from said selectable point equals said selected distance measurement.

10. An apparatus for monitoring the motion of a train, comprising:

a housing mountable in a train;

electronic interface means, disposed in said housing, for interfacing with external means, said external means including means for generating electrical signals representative of the motion of the train and said external means further including power supply means for providing electrical energy to said apparatus;

display means, disposed in said housing, for communicating information to an operator of said apparatus;

first memory means, disposed in said housing, for retaining electrically encoded data without the continued application of electrical energy to said first memory means; and computer means, disposed in said housing, for computing the speed, acceleration and distance traveled of said train in response to said electrical signals, said computer means including:

means, electrically communicating with said electronic interface means, for receiving signals corresponding to said electrical signals;

means, electrically communicating with said display means, for displaying the computed speed, acceleration and distance traveled of the train;

second memory means for providing working data storage space for said computer means, in which space computations of the speed, acceleration and distance traveled are stored;

means for transferring to said first memory means information related to said speed computations stored in said second memory means;

power-up detector means, responsive to said power supply means, for detecting when said electrical energy is applied to said apparatus after a time during which said electrical energy was not applied to said apparatus; and means, responsive to said power-up detector means, for storing in said first memory means electrically encoded information signifying the occurence of a power outage.

11. An apparatus as defined in claim 10, further comprising:

means for entering into said computer means a distance measurement;

means for commanding said computer means to commence a measurement of how far the train travels from an initiation point at which the command is given; and means, responsive to said computer means, for communicating to said operator when the train has traveled from said initiation point an amount equal to said distance measurement.

12. An apparatus as defined in claim 11, wherein:

said external means further includes means for receiving from the train an electrical directional signal indicating the forward or reverse direction of travel of the train; and said computer means is responsive to said directional signal.

13. An apparatus for monitoring the motion of a train, comprising:

a housing mountable in a train;

electronic interface means, disposed in said housing, for interfacing with external means, said external means including means for generating electrical signals representative of the motion of the train;

display means, disposed in said housing, for communicating information to an operator of said apparatus;

first memory means, disposed in said housing, for retaining electrically encoded data without the continued application of electrical energy to said memory means; and computer means, disposed in said housing, for computing the speed, acceleration and distance traveled of said train in response to said electrical signals, said computer means including: means, electrically communicating with said electronic interface means, for receiving signals corresponding to said electrical signals;

means, electrically communicating with said display means, for displaying the computed speed, acceleration and distance traveled of the train;

second memory means for providing working data storage space for said computer means, in which space computations of the speed, acceleration and distance traveled are stored; and means for transferring to said first memory means information related to said speed computations stored in said second memory means; and wherein said external means further includes copying means for copying the electrically encoded data retained in said first memory means, said copying means including:

third memory means for receiving the electrically encoded data retained in said first memory means;

first communication means, connectible to said electronic interface means, for serially transferring said electrically encoded data from said first memory means to said third memory means; and second communication means, connectible to said first memory means, for transferring said electrically encoded data from said first memory means to said third memory means.

14. An apparatus as defined in claim 13, further comprising:

means for entering into said computer means a distance measurement;

means for commanding said computer means to commence a measurement of how far the train travels from an initiation point at which the command is given; and means, responsive to said computer means, for communicating to said operator when the train has traveled from said initiation point an amount equal to said distance measurement.

15. An apparatus as defined in claim 14, wherein:

said external means further includes power supply means for providing electrical energy to said apparatus; and said computer means further includes:

power-up detector means for detecting when said electrical energy is applied to said apparatus after a time during which said electrical energy was not applied to said apparatus; and means, responsive to said power-up detector means, for storing in said first memory means electrically encoded information signifying the occurrence of a power outage.

16. A method of monitoring the motion of a railroad train, comprising:
   (a) detecting signals proportional to the speed at which a railroad train is moving;
   (b) computing, with a first microcomputer located on the train and in response to said signals, respective magnitudes of the speed, rate of change of speed and distance traveled of the train at a plurality of times, said first microcomputer connected to a first communication means for communicating electrical signals;
   (c) electronically storing in a first memory means retained on the train information corresponding to said magnitudes;
   (d) carrying onto the train, at a time subsequent to storing information in said first memory means, a second microcomputer having connected thereto a second communication means for receiving electrical signals, a third communication means for receiving electrical signals, and a second memory means;
   (e) selectably connecting either said first communication means to said second communication means or said first memory means to said third communication means;
   (f) transferring, with said second microcomputer and through the selectably connected ones of said first and second communication means and said first memory means and said third communication means, said information from said first memory means to said second memory means;
   (g) disconnecting the selectably connected ones of said first and second communication means and said first memory means and said third communication means; and
   (h) carrying said second microcomputer and said second communication means, said third communication means and said second memory means off the train.

17. A method as defined in claim 16, further comprising detecting changes in the magnitudes of the speed of said train over a relatively short period of time to determine when the wheels of the train slip.

18. A method as defined in claim 16, further comprising, after said step (f):
   converting, with said second microcomputer, said information transferred to said second memory means into reconstructed magnitudes of said computed speeds, rates of change of speed and distances traveled;
   connecting a peripheral device to said second communication means after said step (g); and
   transferring, with said second microcomputer and through said second communication means, said reconstructed magnitudes to said peripheral device for displaying at a location remote from the train.

* * * * *

UNITED STATES PATENT AND TRADEMARK OFFICE
CERTIFICATE OF CORRECTION

PATENT NO. : 4,561,057

DATED : Dec. 24, 1985

INVENTOR(S) : Haley, Jr., et al.

It is certified that error appears in the above-identified patent and that said Letters Patent is hereby corrected as shown below:

In column 12, line 40, delete the word [Ahsolute] and insert therefor --Absolute--.

Signed and Sealed this

Twelfth Day of August 1986

[SEAL]

Attest:

Attesting Officer

DONALD J. QUIGG

Commissioner of Patents and Trademarks